Aug. 6, 1968  H. L. SMITH, JR  3,395,634
COFFEE ROASTING APPARATUS
Original Filed Jan. 15, 1965  18 Sheets-Sheet 1
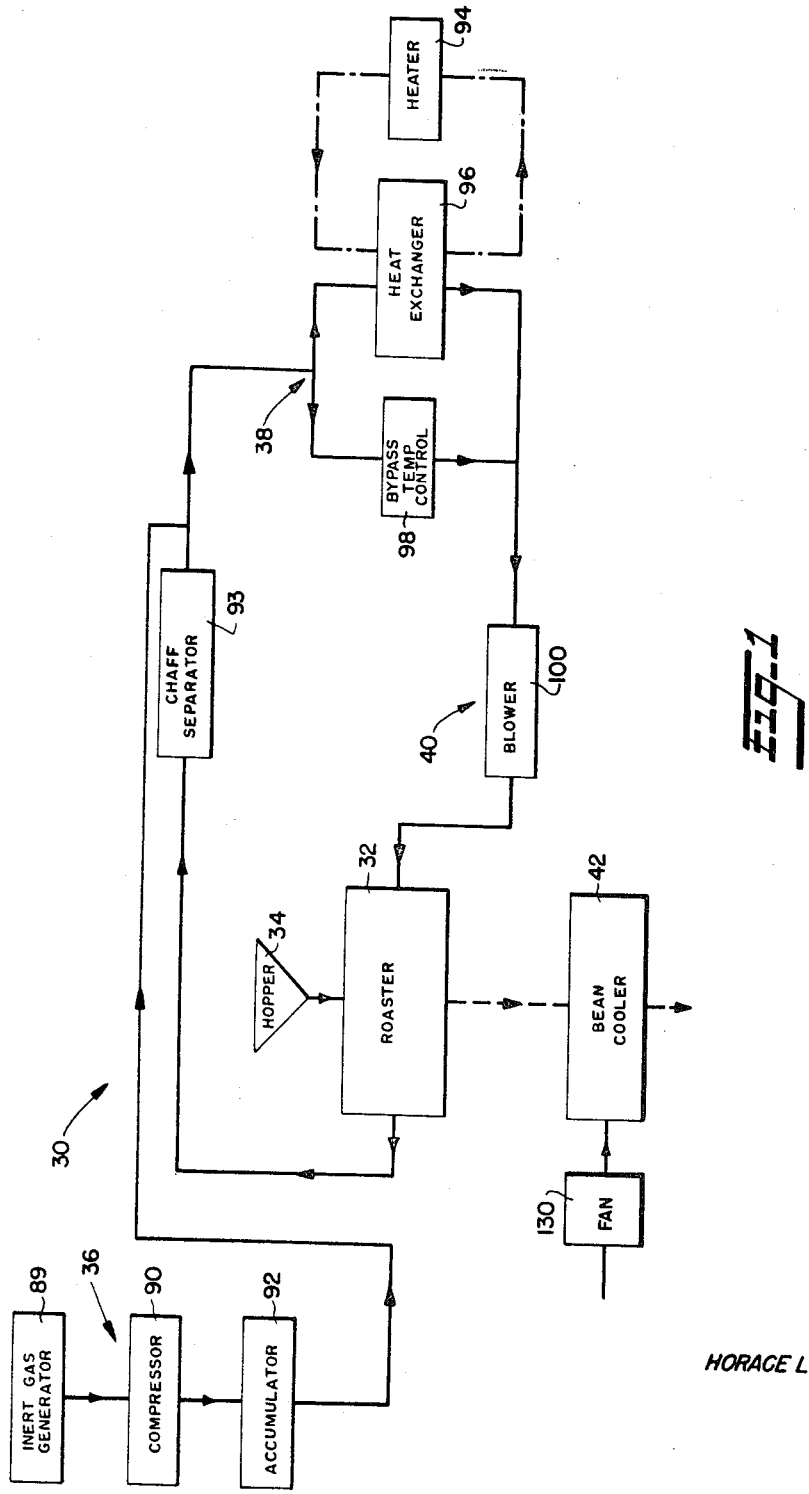
INVENTOR
HORACE L. SMITH, JR.

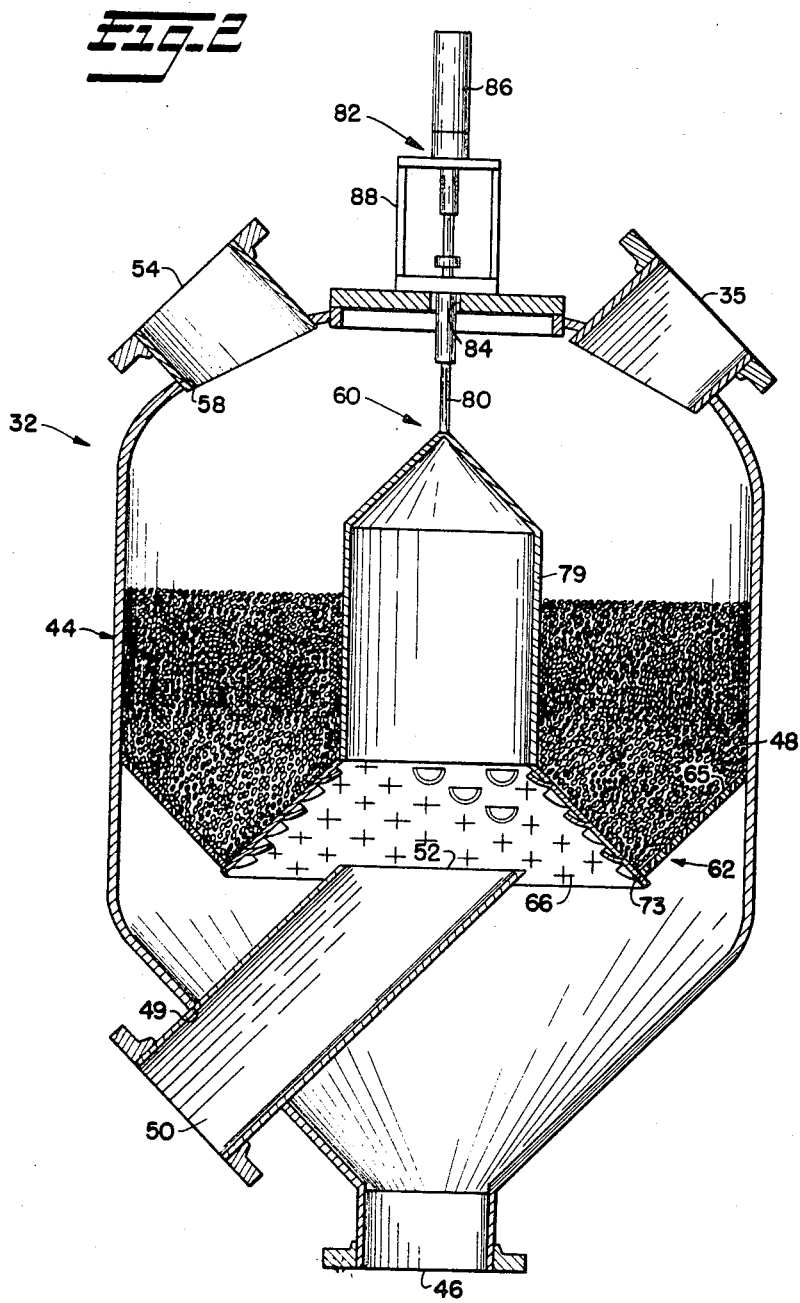

Aug. 6, 1968  H. L. SMITH, JR  3,395,634
COFFEE ROASTING APPARATUS
Original Filed Jan. 15, 1965  18 Sheets-Sheet 3

INVENTOR
HORACE L. SMITH, JR.

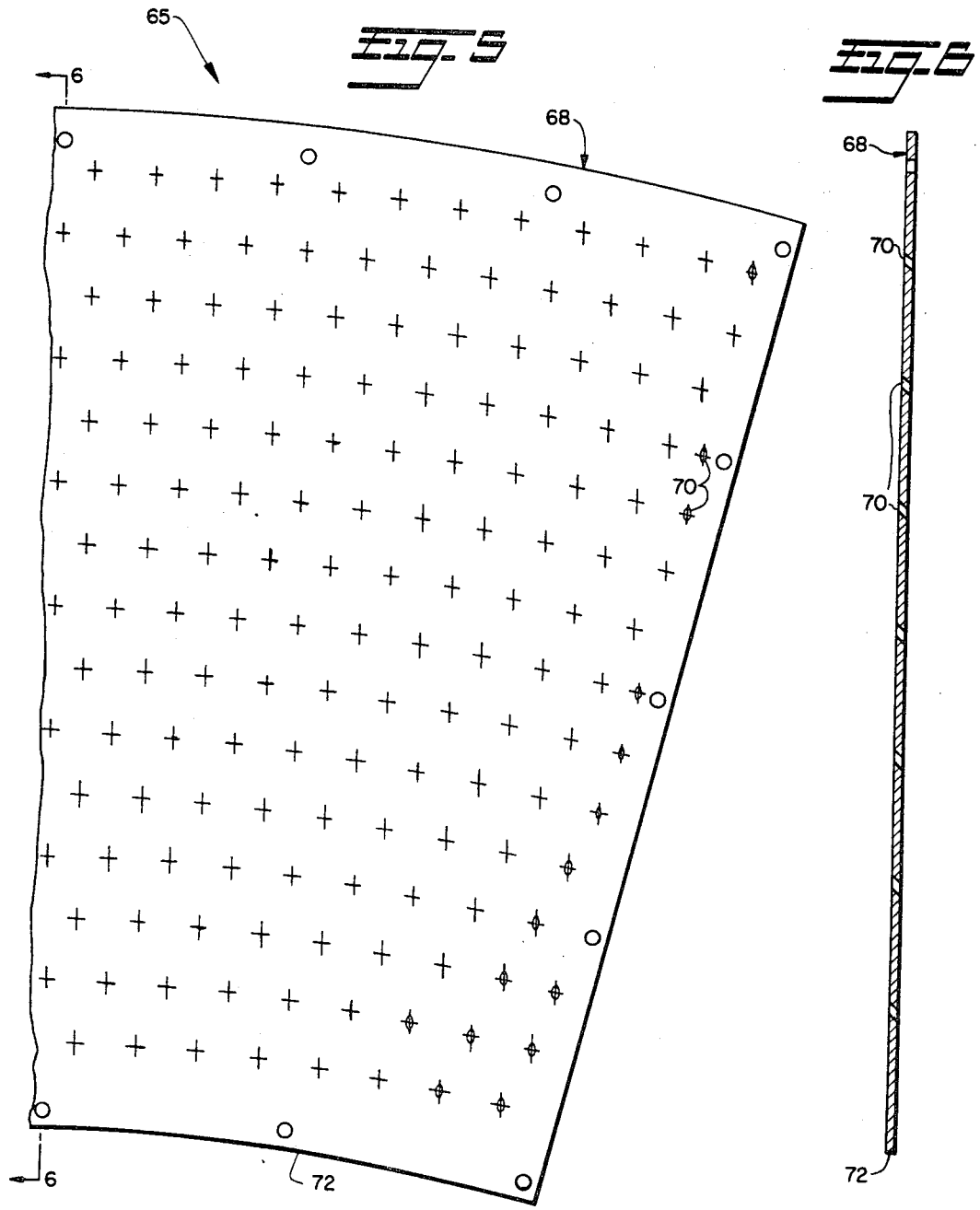

INVENTOR
HORACE L. SMITH, JR.

Aug. 6, 1968  H. L. SMITH, JR  3,395,634
COFFEE ROASTING APPARATUS
Original Filed Jan. 15, 1965  18 Sheets-Sheet 6
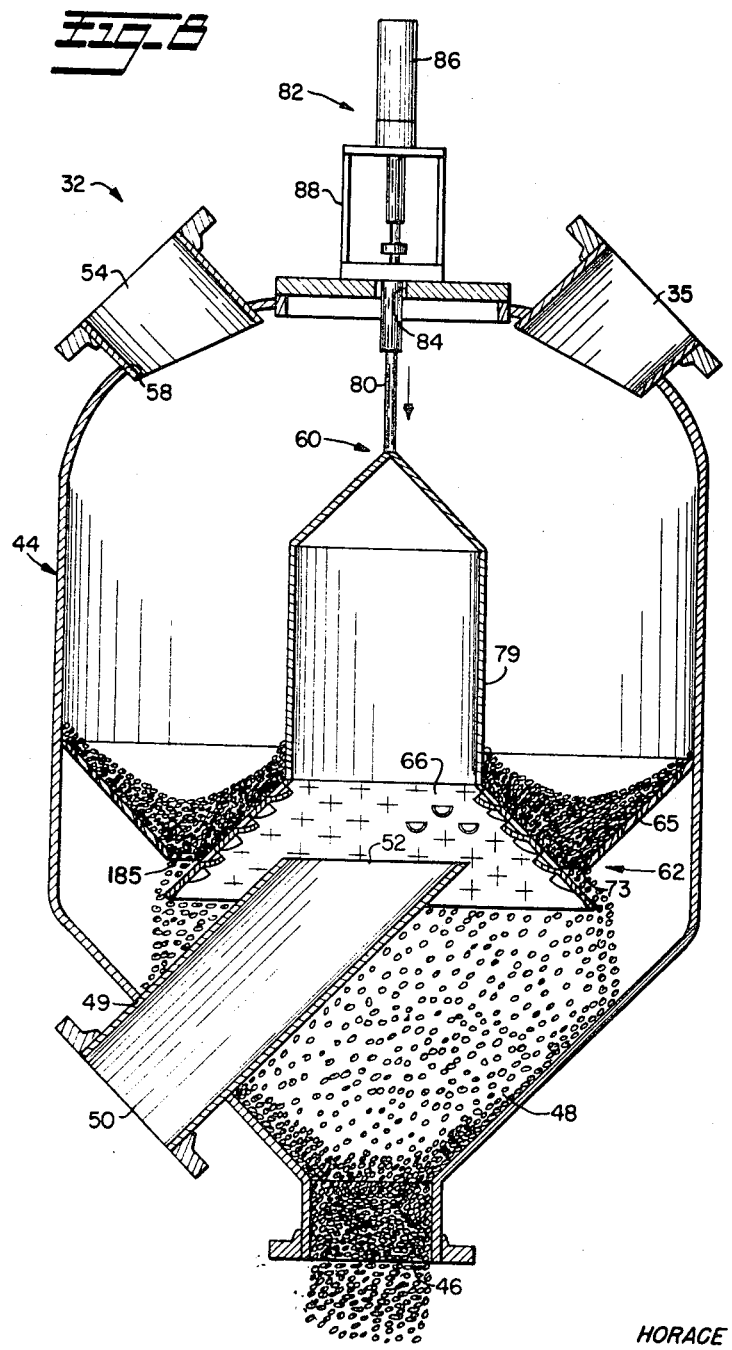
INVENTOR
HORACE L. SMITH, JR.

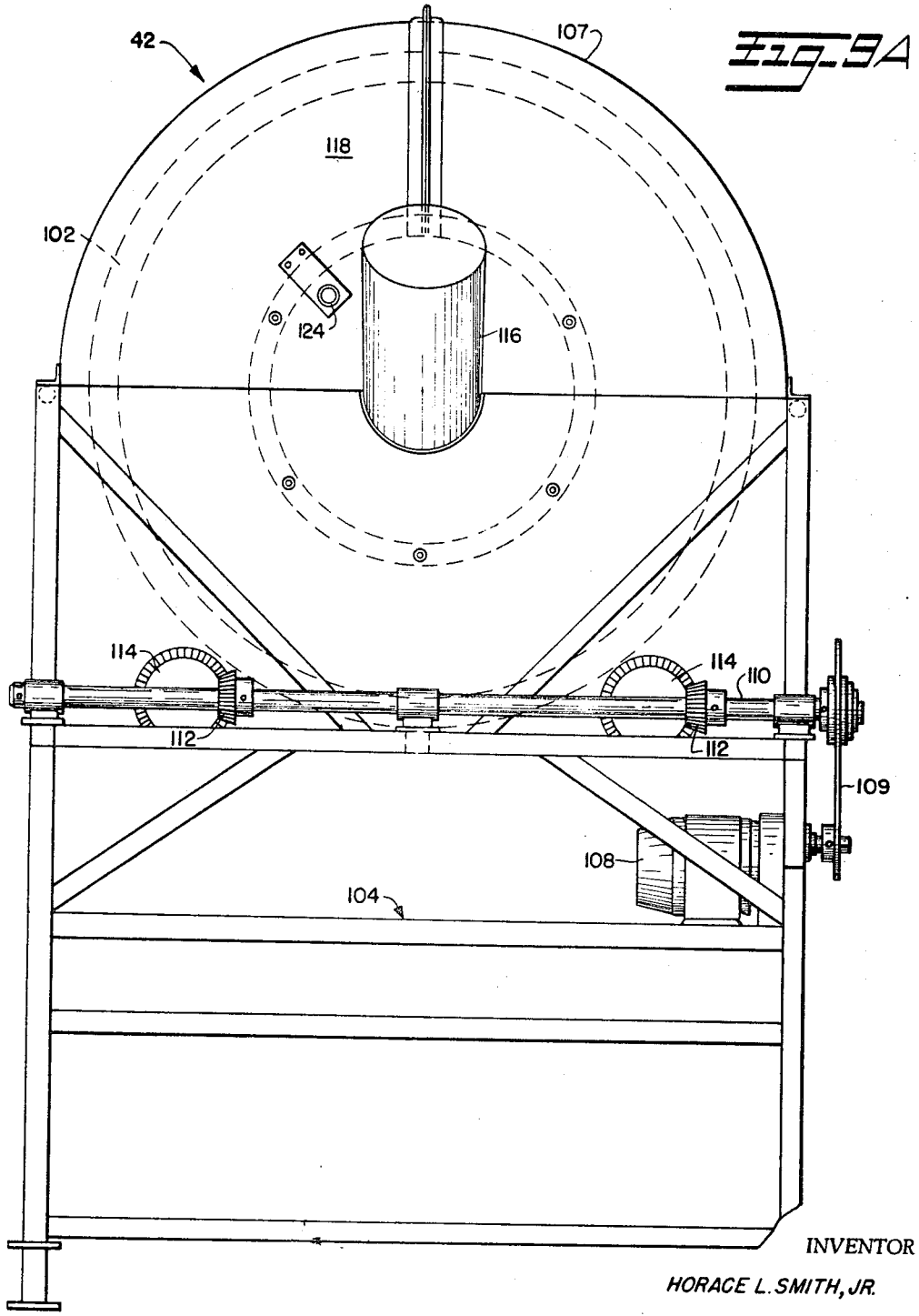

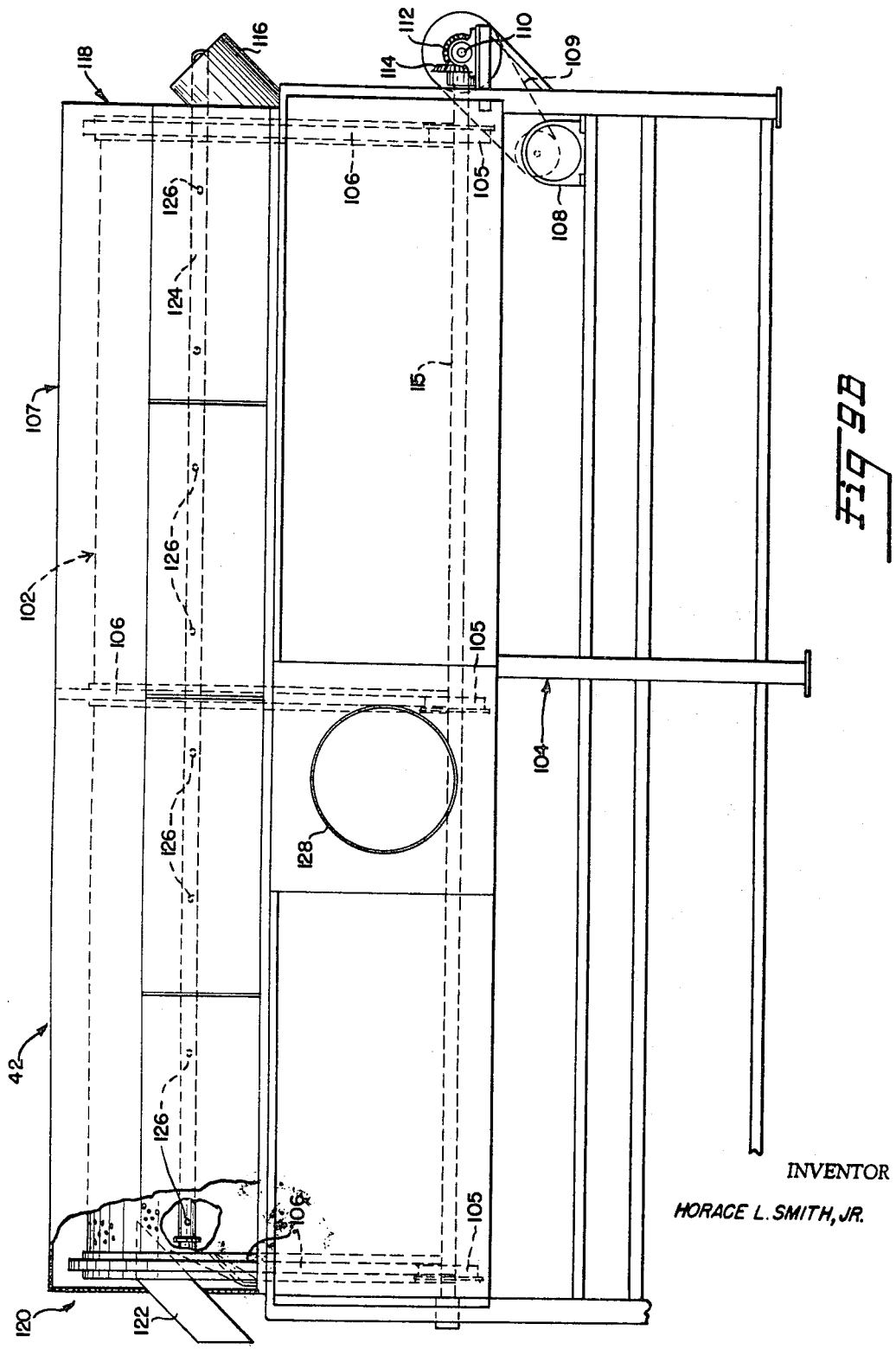

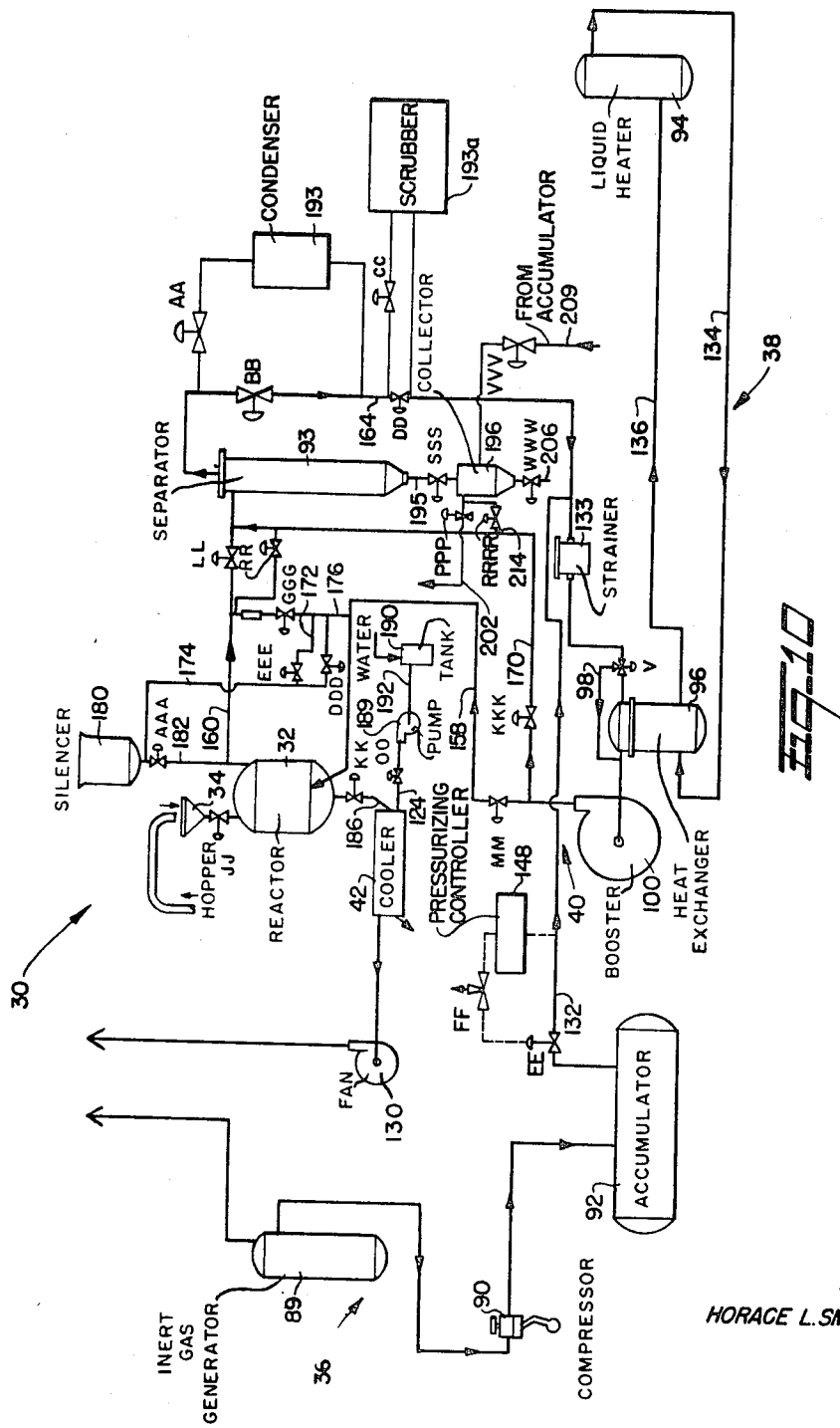

LABORATORY SAMPLE COFFEE ROASTER

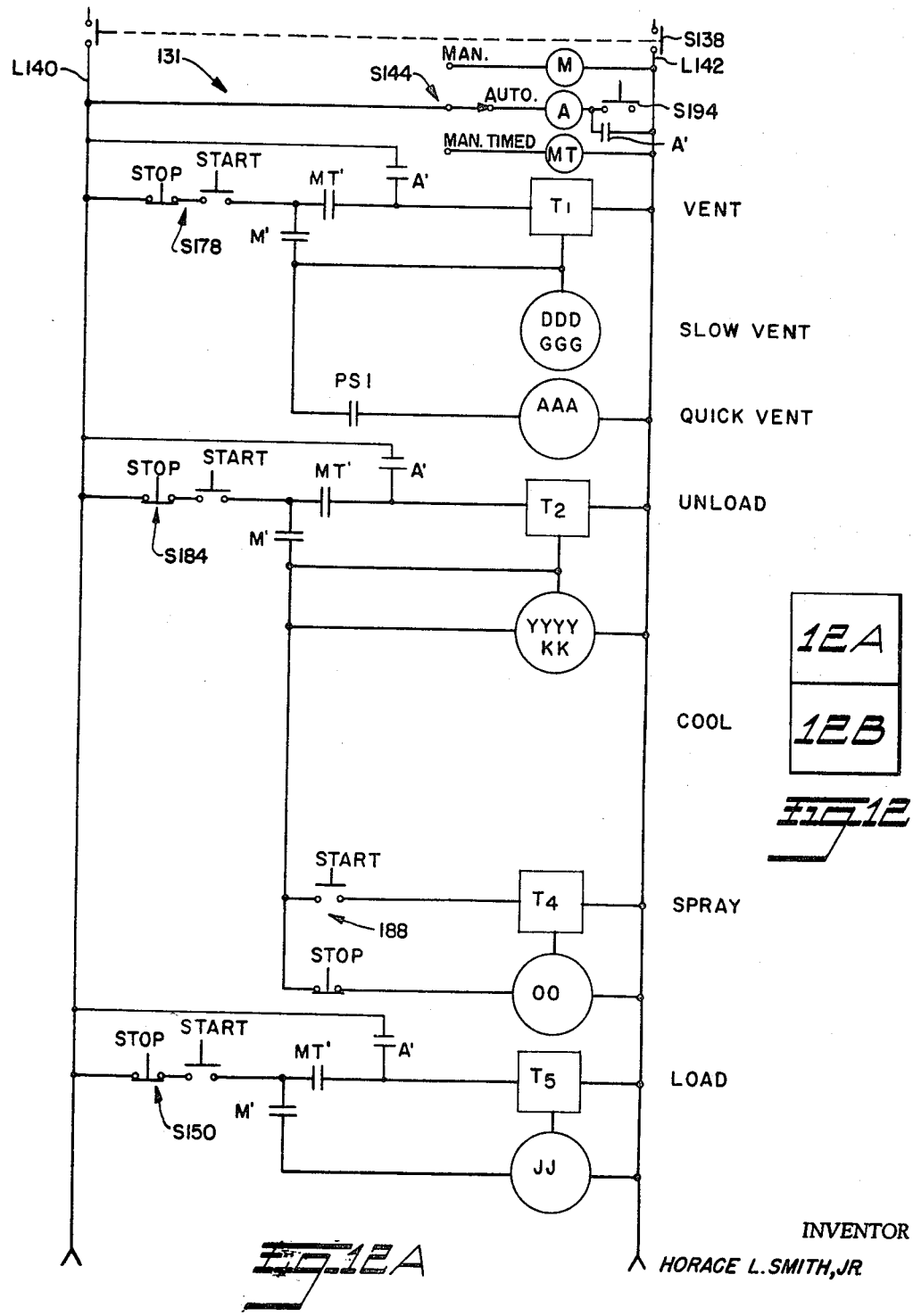

A - AUTOMATIC
M - ALL MANUAL
MT - TIMED MANUAL
T - TEMPERATURE CONTROLLED REACTOR

PSI PRESSURE SWITCH SET TO OPEN AT 50 PSI.

INVENTOR
HORACE L. SMITH, JR.

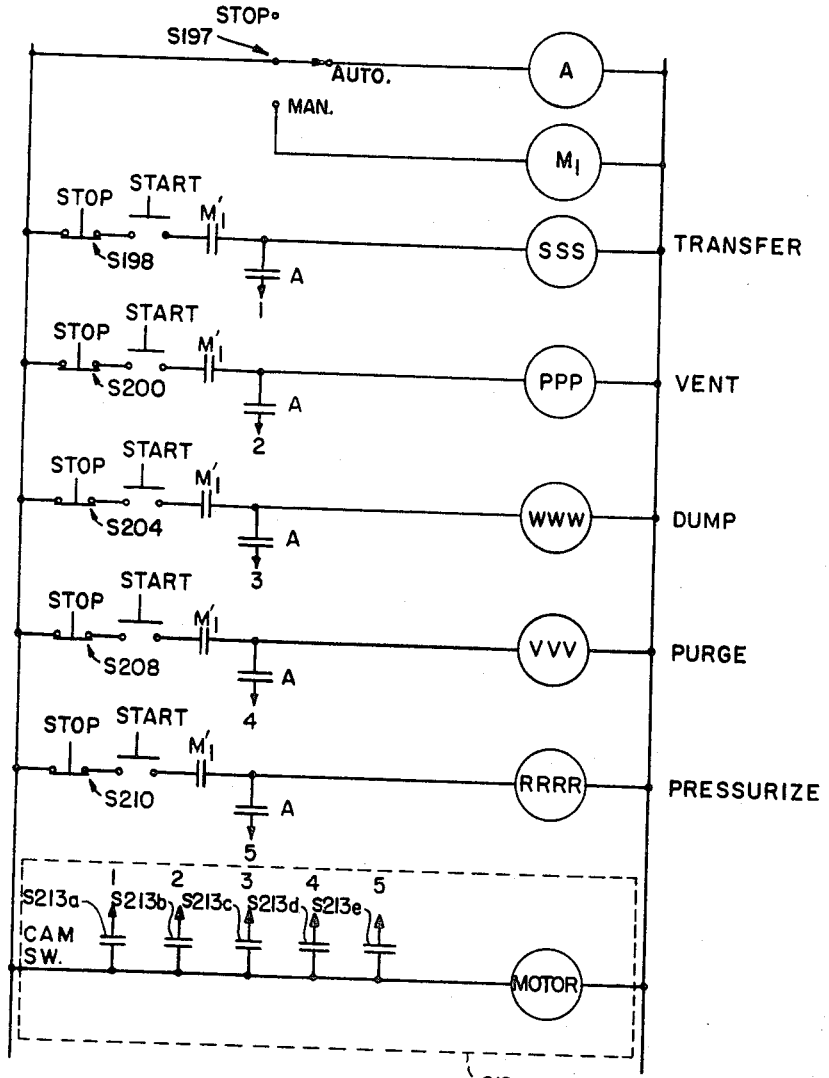

Aug. 6, 1968  H. L. SMITH, JR  3,395,634
COFFEE ROASTING APPARATUS
Original Filed Jan. 15, 1965  18 Sheets-Sheet 14
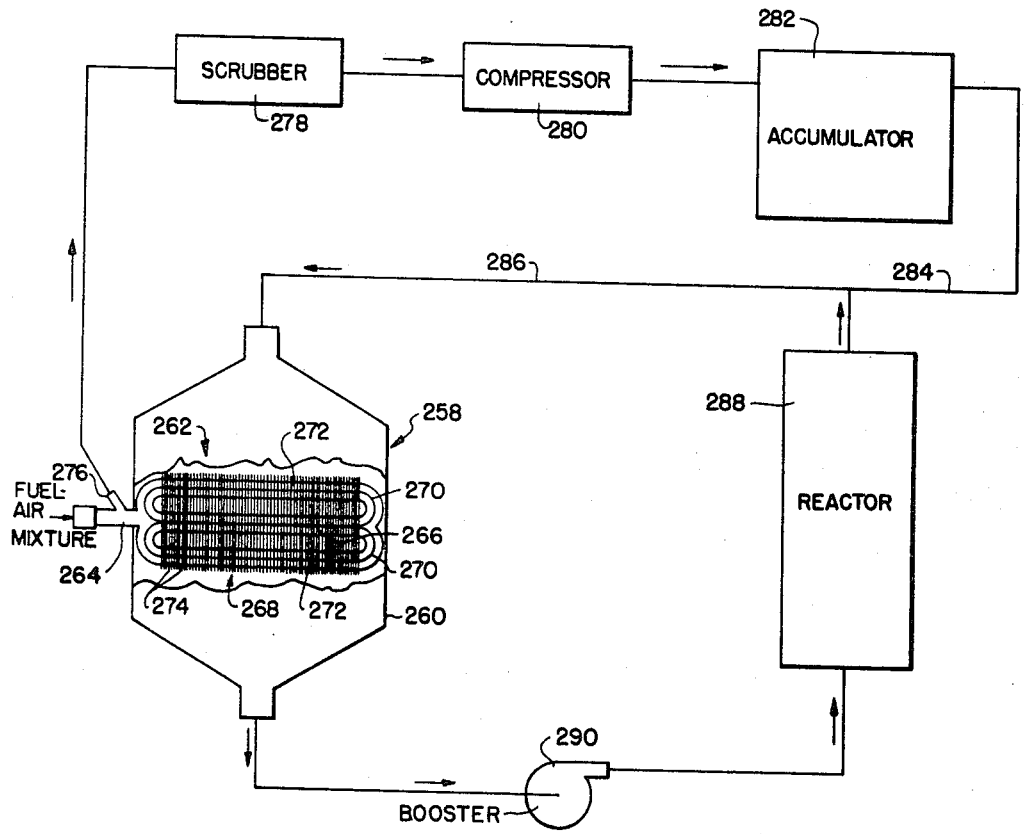
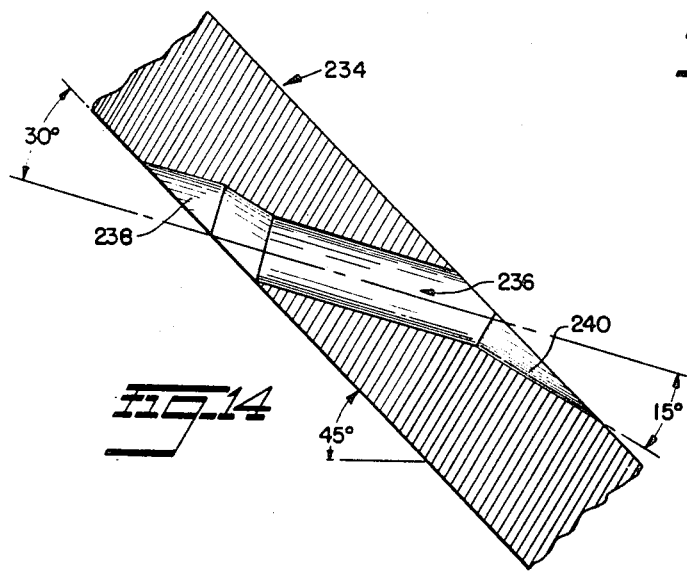
INVENTOR
HORACE L. SMITH, JR.

Aug. 6, 1968  H. L. SMITH, JR  3,395,634
COFFEE ROASTING APPARATUS
Original Filed Jan. 15, 1965  18 Sheets-Sheet 15

INVENTOR
HORACE L. SMITH, JR.

Aug. 6, 1968     H. L. SMITH, JR     3,395,634
COFFEE ROASTING APPARATUS
Original Filed Jan. 15, 1965     18 Sheets-Sheet 16
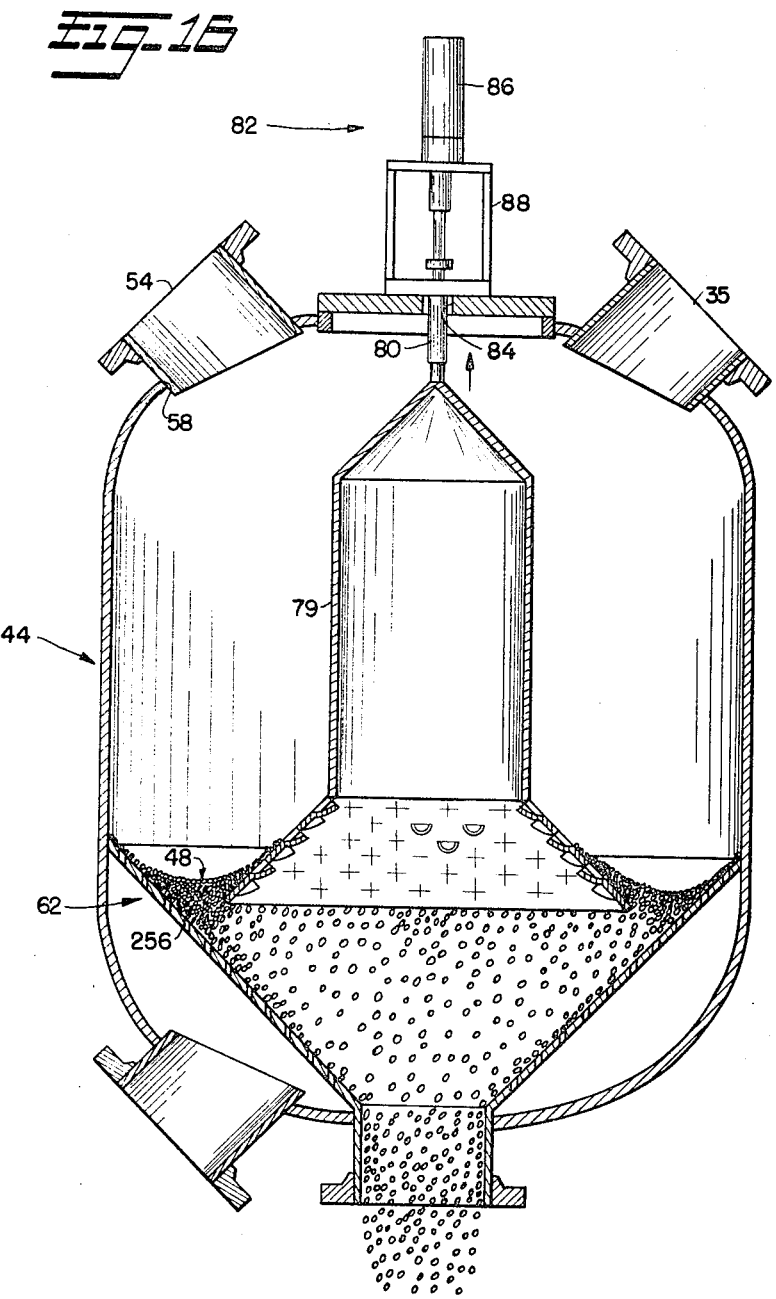
INVENTOR
HORACE L. SMITH, JR.

Aug. 6, 1968 H. L. SMITH, JR 3,395,634
COFFEE ROASTING APPARATUS
Original Filed Jan. 15, 1965 18 Sheets-Sheet 17

INVENTOR
HORACE L. SMITH, JR.

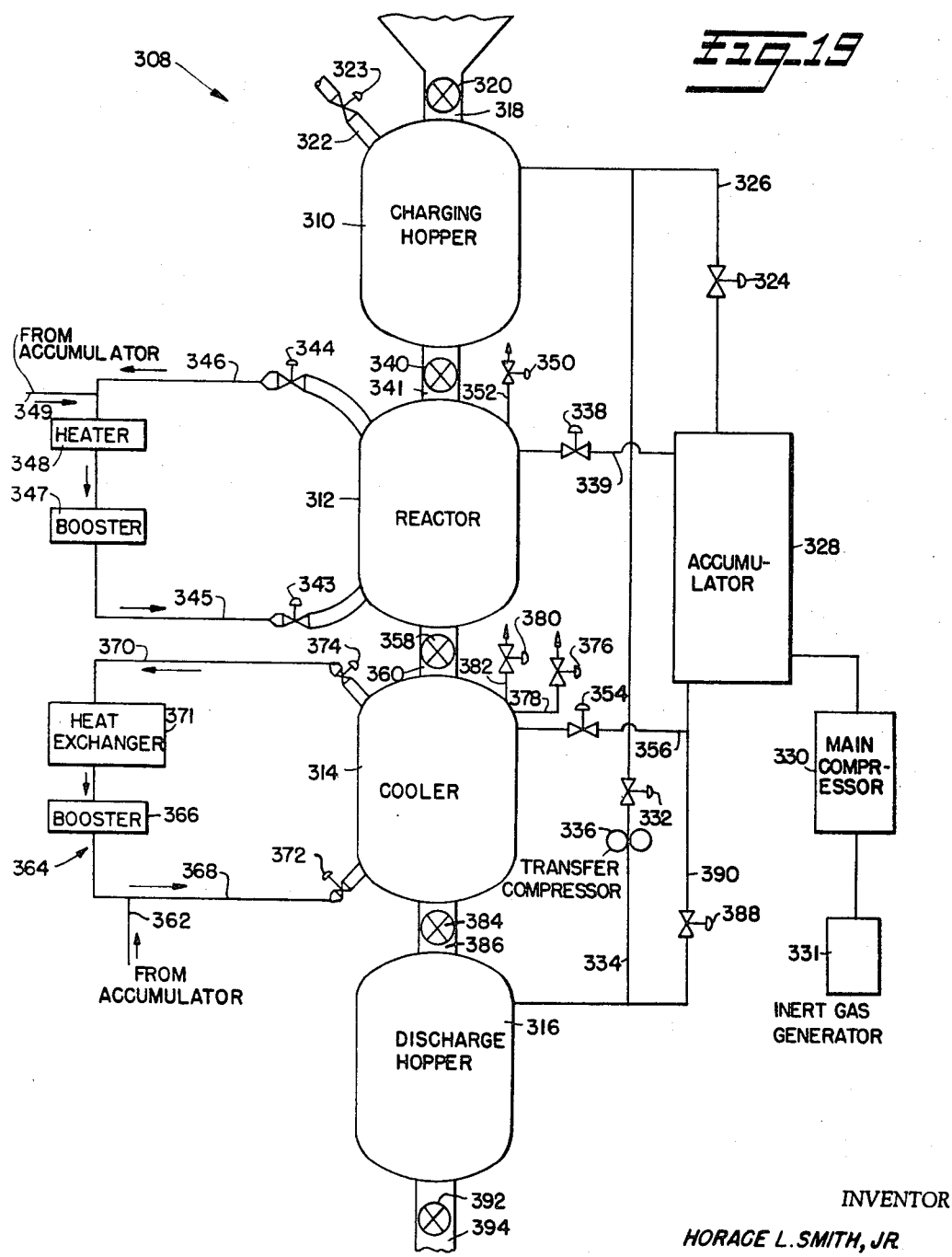

United States Patent Office 3,395,634
Patented Aug. 6, 1968

3,395,634
COFFEE ROASTING APPARATUS
Horace L. Smith, Jr., Richmond, Va., assignor to Hupp Corporation, Cleveland, Ohio, a corporation of Virginia
Original application Jan. 15, 1965, Ser. No. 425,702, now Patent No. 3,345,180, dated Oct. 3, 1967. Divided and this application Sept. 7, 1966, Ser. No. 577,673
17 Claims. (Cl. 99—236)

ABSTRACT OF THE DISCLOSURE

Apparatus for treating particulate solids including at least one pressurizable, isolatable reaction vessel and a closed circulation system for a treating fluid which may include a chaff separating and collecting system, an arrangement for varying the flow rate and temperature of the fluid supplied to the reaction vessel, an arrangement for venting the vessel in which vessel pressures are equalized to minimize stresses on internal components, and an arrangement for separating evolved volatiles from recirculated treating fluid together with an inert gas generator, if desired.

---

This application is a division of application No. 425,702, filed Jan. 15, 1965, for Coffee Roasting Method, now Patent No. 3,345,180.

This invention relates to novel improved fluid-solids [1] contact apparatus.

For the most part, the principles of the present invention will be developed by relating them to the roasting of coffee and the like [2] as this specific application is the most important commercially at the present time and as, in another specific aspect, this invention relates to novel improved apparatus for roasting coffee and other similar products. It is to be understood, however, that the present invention is, in its broader aspects, of far greater utility; and the ensuring discussion of the invention is therefore intended to be illustrative and not limiting with regard to the broader aspects of the invention, which is defined only by the appended claims.

One of the primary objects of the present invention is to provide novel improved apparatus for contacting fluids and solids.

The foregoing and other important objects of this invention are accomplished by utilizing a novel reaction vessel which can be pressurized and in which a bed of the solids to be treated is fluidized and continuously rotated [3] during the fluid treatment cycle. A number of advantages result from fluidizing and continuously circulating the solids while they are being contacted with the treating fluid as will become apparent shortly.

Both fluidized beds and beds in which there is a continuous movement of the solids have heretofore been employed in apparatus for treating solids with gases and fluids. Exemplary apparatus employing fluidized beds are disclosed in U.S. Patents Nos. 2,212,120, issued Aug. 20, 1940, to R. D. Kneale et al. for Method of Roasting Coffee; 2,857,683, issued Oct. 28, 1958, to F. Schytil for Coffee Roaster; and 2,859,116, issued Nov. 4, 1958, to E. Heimbs et al. for Treatment of Coffee and Other Materials. Exemplary of the patents disclosing apparatus in which there is circulation of the solids being treated are U.S. Patents Nos. 2,437,694, issued Mar. 16, 1948, to C. N. Hickman for Method for Blending Powder Grains; 2,689,973, issued Sept. 28, 1954, to L. V. Lee et al. for Method and Apparatus for Contacting Solids With Gases; and 2,786,280, issued Mar. 26, 1957, to P. E. Gishler et al. for Method of Contacting Solid Particles With Fluids; and German Patent No. 1,064,789, issued Sept. 3, 1959, to H. Bach for Vorrichtung für Aromaverbesserung und Stabilisierung von Röstkaffee.

The present invention differs from anything disclosed in the prior art in that there is *both* fluidization and rotation of the bed of solids. In addition, the pattern of circulation or rotation differs from that which occurs in the prior art apparatus. Specifically, all of the above-identified patents disclosing beds in which there is circulation of the particles are concerned with what are known as "spouted beds" in which the solids are moved upwardly in a small spout in the center of the bed by the treating fluid and migrate downwardly in the remaining, major, outer portion of the bed. This contrasts directly with the present invention in which, as mentioned above, the solids move upwardly in the peripheral regions of the bed and downwardly in its inner reaches. In other words, in the fluidized rotating bed of the present invention, the particles of solids circulate in a manner directly opposite that to which they circulate in a spouted bed.

The fluidized rotating bed of the present invention has important advantages over both the fluidized and spouted beds of the prior art as was indicated previously. First, in the present invention, there is a materially more uniform treatment of the solids because of the continuous rapid turnover of the solids in the fluidized rotating bed. In fluidized beds the solids are practically stagnant; and the treating fluid changes characteristics (for example, cools) as it passes upwardly through the bed. Consequently, the treatment given the solids in the upper part of the bed may vary widely from the treatment of the solids in the lower reaches of the bed; and different particles of the treated product may therefore have radically different characteristics.

Solids treated by spouted bed techniques may also contain particles of widely varying characteristics because there is an extremely slow turnover of the solids due to the sluggish downward migration of the solids in all but the central spout of a spouted bed. This is because the area of the spout is necessarily very small in comparison to the total area of the bed. As the nonspouted areas of the bed contain a very large part of the solids and as the volume of the solids moving downward in the nonspouted part of the bed cannot exceed the volume of solids moving upwardly in the spout while maintaining the stability of the bed, the downward migration of the solids is necessarily very slow. Moreover, spouted beds are subject to short-circuiting, which even further increases nonuniformity of the treated product.

A second important advantage of the present invention is that it is much more versatile than anything heretofore known including apparatus utilizing fluidized and spouted beds. For example, the reaction vessel may be maintained at pressures varying from atmospheric pressure (or less than atmospheric pressure) to several hundred pounds per square inch without upsetting the fluidization or rotation of the bed of solids. Similarly, for a given pressure, the mass rate of flow of the treating fluid can be varied over wide limits without adversely effecting fluidization or rotation of the solids. Also, other parameters such

---

[1] The term "fluid" is used generically herein to encompass gases, mixtures of gases, and other materials with similar flow properties.
[2] Other typical applications of the present invention include the roasting of other food products such as cocoa beans and nuts and the manufacture of expanded food products such as puffed cereals and popcorn. The present invention may also be used for drying cereal grains or other particulate solids and for effecting a wide variety of chemical reactions commonly carried out in fluidized beds. In short, the present invention is applicable to virtually all processes involving the contact of fluids with particulate solids.
[3] The term "fluidized rotating bed" will be employed to described a bed of solids which is fluidized and in which the solids continuously circulate in paths (shown in FIGURE 7) in which the solids move upwardly in the peripheral regions of the reaction vessel, inwardly in the upper part of the bed, downwardly in the inner region of the reaction vessel, and outwardly in the lower part of the bed.

as the composition and temperature of the treating fluid can be varied as desired for particular applications without adverse effect.

A third advantage of the present invention over fluidized and spouted bed and other prior art techniques is that the solids treatment can be more accurately controlled because of the intimate and uniform fluid-solids contact provided. This is extremely important in many, if not most, processes utilizing fluid-solids contact.

A further advantage of the present invention in roasting and other applications where the solids are heated by the treating fluid is that there is a substantially higher rate of heat transfer from the treating fluid to the solids than in prior art apparatus because of the fluidized rotating bed and because the reaction vessel is pressurized. This materially reduces processing time and, therefore, production costs. In addition, in many applications of the present invention, the decreased process time and pressurized fluid treating environment reduce the loss of volatile constituents or otherwise beneficially effect the solids. Therefore, in many such applications, the techniques of the present invention provide a treated product which, in comparison to products obtainable by prior art techniques, has materially improved quality or other improved characteristics. Analogously, the reduction in process time, treatment under pressure, and the versatility of the present invention provide materially higher yields in many applications of the invention, making the present invention more economical than apparatus utilizing prior art techniques.

Another advantage of the present invention is that power requirements are minimized because there is only a small pressure drop (typically less than or slightly above 1.5% of the system pressure) in the treating fluid as it passes through the reaction vessel.

Another important advantage of the present invention is that it can be readily employed where the particle size of the solids to be treated is too large to be fluidized in the conventional manner. As pointed out in the Gishler patent mentioned above, it is extremely difficult to fluidize particles having a size greater than 20 mesh and entirely impracticable to fluidize particles as large as grains of wheat by conventional techniques. By employing the principles of the present invention, however, beds of much larger particles—coffee beans, for example—can be readily fluidized and rotated.

The present invention also has a further advantage over spouted bed techniques in that a much larger bed of solids can be treated. As a practical matter, a spouted bed cannot be more than a few inches in diameter. As the width of the bed is increased, the diameter of the spout must be increased or the downward migration of the solids in the non-spouted portions of the bed will be so sluggish as to render the process useless. However, the power required to produce spouting increases much more rapidly than spout diameter; and, if the diameter of the spout is greater than a very few inches, the power required to produce it in other than a shallow bed of no practical utility is economically impracticable. Also, spouts in extremely shallow beds or in beds more than a few inches in diameter are unstable. This factor makes it further impracticable to produce spouted beds which are sufficiently large for use on a commercial scale.

From the foregoing, it will be apparent that further important objects of the present invention include the provision of novel improved fluid-solids contact apparatus:

(1) Which is applicable to a wide variety of processes involving fluids-solids contact;

(2) In which the bed of solids to be treated is fluidized and continuously rotated by the treating fluid;

(3) Which is capable of producing a more uniform final product and/or a higher quality product or one with better characteristics than has heretofore been obtainable;

(4) Which is capable of producing a more rapid turnover of the particles being treated than has heretofore been possible;

(5) Which is more versatile than the prior art apparatus for producing fluid-solids contact;

(6) In which the treatment of the solids can be more accurately controlled than has heretofore been possible;

(7) Which, when the solids are heated, provides a higher rate of heat transfer from the treating fluid to the solids than heretofore employed techniques;

(8) Which materially reduces the time required to effect a given treatment;

(9) Which is capable of handling solids of larger particle size than the apparatus of the prior art; and

(10) In which it is practicable to treat a larger bed of solids than can be treated by spouted bed and similar prior art techniques.

Another important specific object of this present invention is the provision of novel improved apparatus which incorporates the novel fluid-solids techniques discussed above and is particularly adapted for coffee roasting and similar applications.

Roasting coffee by employing the fluid-solids contact techniques described above has a number of advantages. These include increased yields and a roast which is more uniform, has a higher percentage of extractibles (typically on the order of 10% higher), and a higher percentage of total solids in the cup.

The advantage of increased yields and a more uniform roast are self-evident.

The higher percentages of total extractibles is of considerable economic importance in the manufacture of instant coffee in that the yield of instant coffee from unroasted beans is a direct reflection of the total extractibles in the roasted coffee. Therefore, use of the present invention decreases the cost of producing instant coffee.

The higher total solids content provided by the present invention is also important because the quality of brewed coffee is directly related to the total solids content of the roasted beans. Therefore, coffee roasted in the apparatus of the present invention makes a better cup of coffee than the same coffee roasted by other techniques.

Another extremely important advantage of the present invention in the roasting of coffee is that, because of its versatility and the close control over the roasting process it provides, it materially reduces the loss of desirable volatiles and, at the same time, makes it possible to drive off undesirable volatile components from the beans. As a result, cheap low grade coffees roasted in accord with the present invention can be upgraded to a quality equal to that of expensive beans roasted by the processes heretofore employed. Consequently, the present invention provides a material economic advantage over both the prior art processes for producing coffee for grinding and for producing instant coffee because the major cost factor in producing coffee of both types is the cost of the coffee itself.

Another important advantage of roasting coffee in accord with the principles of the present invention is that the flexibility and versatility of the present invention makes it readily adaptable to the roasting of all types of coffee beans, a versatility which heretofore known coffee roasters do not possess.

From the foregoing it will be apparent that further specific and important objects of the present invention include the provision of novel improved coffee roasting apparatus which, in contrast to that heretofore available:

(1) Produces increased yields;

(2) Produces a more uniform roast and a more uniform final product;

(3) Produces a higher total solids content in the roasted coffee;

(4) Produces a higher percentage of total extractibles in the roasted coffee;

(5) Is capable of producing roasted products of higher quality from inferior, low priced beans;

(6) In conjunction with the preceding object, is capable of duplicating a given roasted coffee or blend of coffees at a much lower cost;

(7) Is capable of roasting all varieties of coffee beans; and (8) Produces a roasted coffee of increased shelf life.

From another aspect, the present invention relates to a novel circulation system for the treating fluid which permits the reaction vessel to be depressurized for loading and unloading and other purposes without reducing the pressure in the remainder of the fluid circulation system. The advantages of this feature are manifest.

A further important feature is a novel system for accurately controlling the temperature of a heated fluid and the flow of the fluid through the roasting vessel. This is of material importance in that it provides precise control of the roasting or other heating process and, therefore, the final product.

The present invention preferably employs a closed roasting fluid circulation system, which permits the roasting fluid to be continuously recirculated through a suitable heating unit and the reaction vessel. This minimizes heat losses and, if an inert gas is employed, the amount of inert gas which it is necessary to generate.

Another important feature of this invention is the incorporation in the circulating system of apparatus such as a condenser or scrubber for removing from the fluid exiting from the reaction vessel at least a portion of the volatiles evolved from the product being roasted and carried from the vessel by the roasting fluid. Provision of the foregoing components makes it possible to closely control the composition of the roasting fluid. For example, this arrangement may be employed to remove from the roasting fluid undesirable evolved volatiles which would otherwise be recirculated to the reaction vessel and condense on the product being roasted or cause undesirable chemical reactions in the product. The arrangement just described, therefore, increases the versatility of the present invention and makes it capable of producing products of higher quality by affording control over the composition of the roasting fluid.

Further control over the treated product and additional versatility are provided by the provision of a novel system for pressurizing and venting the reaction vessel during and after the treatment cycle. This novel arrangement is particularly important in coffee roasting and similar applications as it provides precise control over such quality affecting factors as developments (i.e., increase in size and reduction in bulk density) of the product being roasted and the nature of the volatiles in the roasted product and makes the plant adaptable to the processing of a wide variety of products.

Another important feature of the apparatus disclosed herein is the incorporation of a small, laboratory scale reaction vessel and control system in which samples can be processed. This permits times, temperatures, and other operating parameters for processing different materials and variations in like materials to be determined at low cost, resulting in substantial economic advantages.

A further important feature of the novel plants disclosed herein is a control system which permits treatment factors such as times, temperatures, etc., to be easily and quickly varied, thus increasing the flexibility and versatility of the invention. Further versatility is provided by the inclusion of controls which make it possible to control the treatment process manually, automatically, or by manual timed operation in which the steps of the treatment process are manually initiated and thereafter automatically controlled.

A further important object of the present invention therefore resides in the provision of novel improved apparatus for roasting coffee and like applications and for other processes employing fluid-solids contact and having the features discussed in the preceding paragraphs and other important and novel features which will be described hereinafter.

Additional objects, other advantages, and further novel features of the present invention will become apparent from the appended claims and as the ensuing detailed discussion and description of preferred embodiments of the present invention proceeds in conjunction with the accompanying drawing, in which:

FIGURE 1 is a flow diagram of a plant for roasting coffee and the like constructed in accord with the principles of the present invention;

FIGURE 5 is a fragmentary plan view of one segment of a second nozzle plate employed in the reaction vessel of FIGURE 2;

FIGURE 6 is a section through the nozzle plate of FIGURE 5, taken substantially along line 6—6 of the latter figure;

FIGURE 7 is a fragment of a section through the reaction vessel of FIGURE 2 to an enlarged scale, showing the circulation pattern of the solids being treated;

FIGURE 8 is a view similar to FIGURE 2, but with the reaction vessel's dump mechanism operated to discharge the treated product from the reaction vessel;

FIGURE 9A is an end view of a cooler employed in the plant of FIGURE 1;

FIGURE 9B is a side view of the cooler of FIGURE 9A;

FIGURE 10 is a simplified mechanical schematic of the installation of FIGURE 1;

FIGURE 13 is a simplified schematic of the control system for a chaff collector employed in the installation of FIGURE 1;

FIGURE 14 is a fragmentary section through an alternate form of nozzle plate which may be substituted for that illustrated in FIGURES 3 and 4;

FIGURE 15 is a view similar to FIGURE 2 of a reaction vessel with a modified form of dump mechanism;

FIGURE 16 is a view similar to FIGURE 15, showing the dump mechanism positioned to discharge the treated product from the reaction vessel;

FIGURE 19 is a generally diagrammatic illustration of a third form of coffe roasting installation constructed in accord with the principles of the present invention.

Figures 3, 4:
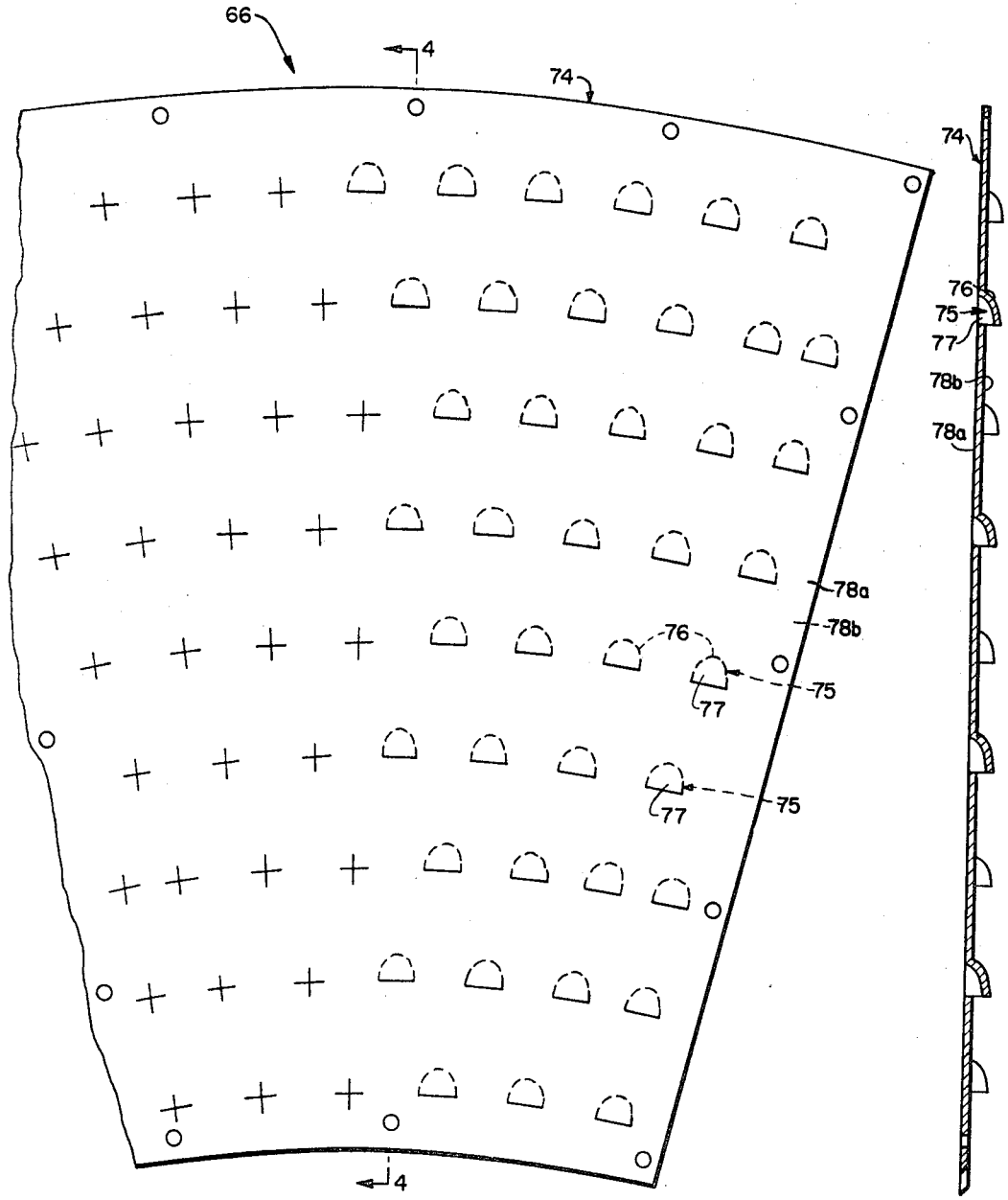
FIGURE 3 is a fragmentary plan view of one segment of a nozzle plate employed in the reaction vessel of FIGURE 2.
FIGURE 4 is a section through the nozzle plate segment, taken substantially along line 4—4 of FIGURE 3.

Referring now to the drawing, FIGURE 1 depicts diagrammatically a coffee roasting plant 30 constructed in accord with the principles of the present invention.[4] System 30 includes, generally, a roasting or reaction ---
[4] Coffee roasting plant 30 may equally well be employed to roast other products including those mentioned above and many others which will readily occur to those skilled in the arts to which the present invention pertains.

vessel 32 into which unroasted beans are loaded from a hopper 34 through an inlet 35, a system 36 for generating an inert roasting gas, a system 38 for heating the roasting gas, a system 40 for circulating the gas through the reaction vessel, and a cooler 42 for quenching the roast and cooling the roasted beans.

Figure 2:
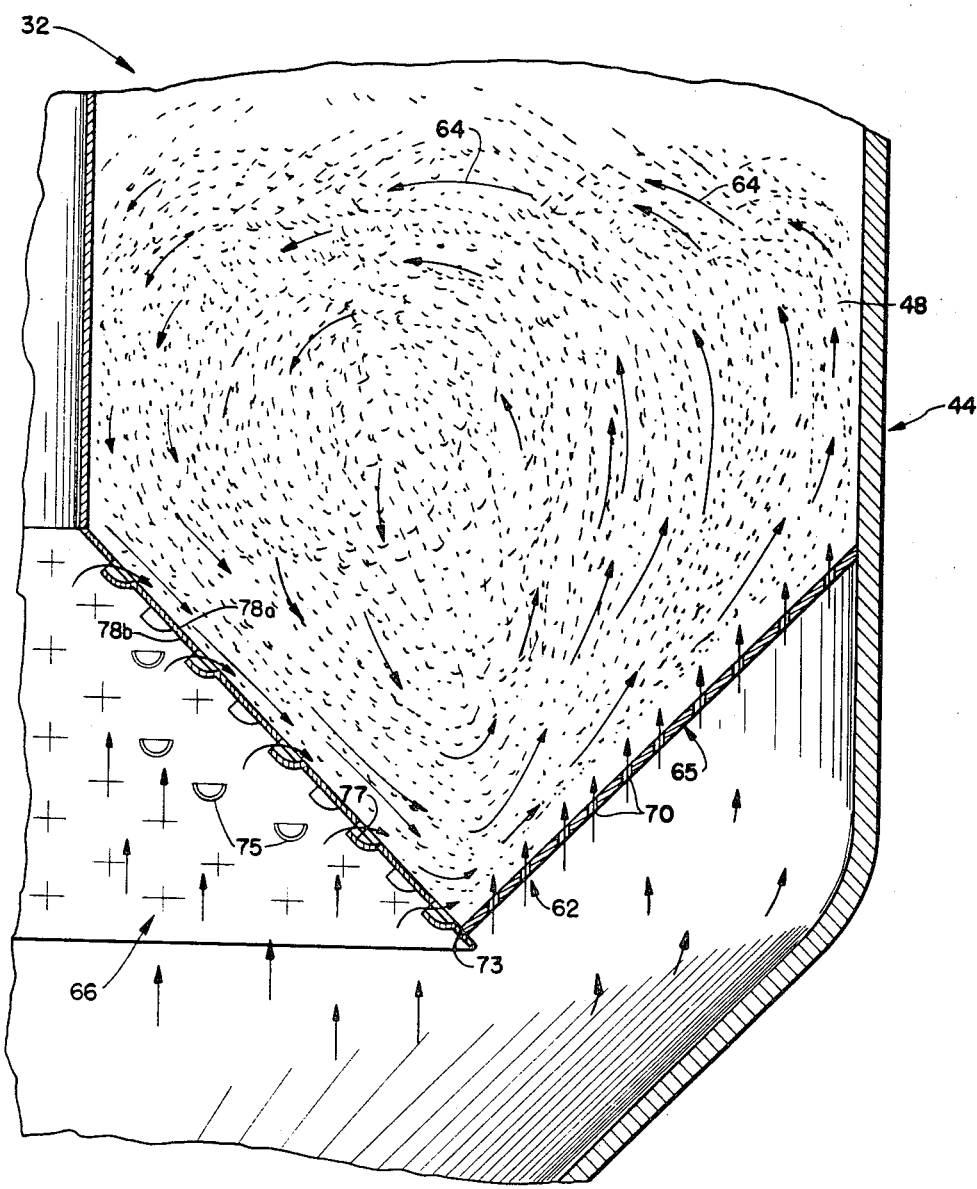
FIGURE 2 is a section through a roasting or reaction vessel employed in the plant of FIGURE 1 and for other processes involving fluid-solids contact.

The most important component of roasting system 30 and one of the most important features of the present invention is reaction vessel 32, which is illustrated in more detail in FIGURE 2. Referring now to the latter figure, reaction vessel 32 has a vertically elongated cylindrical shell 44 which, in one actual embodiment of the present invention, has a diameter of approximately six feet. Inasmuch as, in many applications of the present invention, the fluid-solids treatment can advantageously be carried out under pressure, reaction vessel 32 is preferably constructed to withstand pressures of several hundred p.s.i. In the lower end of reaction vessel shell 44 is a centrally located aperture or dump opening 46 through which the coffee beans or other product being roasted or otherwise treated (identified by reference character 48 in FIGURE 2) is discharged.

A second aperture 49, also formed in the lower portion of the reactor shell, accommodates an inlet conduit 50 for a heated roasting (or other) fluid. The fluid flows from conduit 50 into the reaction vessel through an outlet 52 in the lower central portion of the vessel.

The fluid thus supplied to the reaction vessel passes upwardly through the bed 48 of product being roasted or otherwise treated and is exhausted from the reaction vessel through an outlet conduit 54 extending through an aperture 58 in the upper part of shell 44.

In addition to the components just described, reaction vessel 32 also has a dump mechanism 60 for discharging the treated product through the dump opening 46 and a fluid distributing and directing or flow control assembly 62, which is one of the most important and novel features of the present invention.

It is the function of flow control assembly 62 to direct the treating fluid entering the reaction vessel through inlet conduit 50 into the bed of solids 48 in such a manner as to fluidize the bed of solids and to effect a rotation of the bed by circulating the solids in paths in which they are moved upwardly in the peripheral regions of the reaction vessel, inwardly toward the center of the reaction vessel in the upper part of bed 48, downwardly in the central regions of the reaction vessel, and outwardly in the lower part of bed 48, as shown by arrows 64 in FIGURE 7. The circulation of the coffee beans or other particulate solids being treated through a path of the type just described is of extreme importance inasmuch as this pattern of circulation provides intimate, uniform contact between the particles in bed 48 and the heated gas or other treating fluid flowing through the bed of solids with the resulting advantages described previously.

As shown in FIGURES 2 and 7, flow control assembly 62 includes an outer frustoconical flow plate 65 bolted or otherwise fixed to the interior of reaction vessel shell 44 and an inner frustoconical flow plate 66 adapted to be moved upwardly against and engage the lower edge of flow plate 65 to support the bed of solids 48.

Referring now to FIGURES 5, 6, and 7, the outer conical flow plate 65 is constructed to direct 60-70% of the fluid entering the reaction vessel through inlet conduit 50 in a generally vertical direction upwardly through the bed of solids 48. In the embodiment of the present invention mentioned above, outer flow plate 65 is formed of nine identical segments 68 which are fabricated from 0.125 inch thick 304 or 316 stainless steel. When the individual segments are assembled, the surfaces of flow plate 65 are at an angle of 45° to the horizontal; and the inner edges 72 of the nine segments cooperate to define a circular opening 73 which is concentric with the centerline of the reaction vessel and through which inner flow plate 66 extends.

As best shown in FIGURE 7, flow apertures 70 are drilled or otherwise formed in flow plate 65. In the actual reaction vessel just described, there are 301 0.136 inch diameter apertures 70 in each of the nine segments 68 of the outer flow plate. The apertures are drilled at an angle of 45° to the surfaces of segments 68 so that, when flow plate 65 is installed in reaction vessel 32, apertures 70 will be vertically oriented. The apertures are arranged in circular rows with the radial distance between rows being equal and approximately one inch. The number of apertures in each row (per segment) is varied from 16 in the innermost row to 24 in the outermost row to maintain the distance between apertures 70 approximately equal (about one inch on centers), thereby providing a uniformly distributed air flow through outer flow plate 65.

Referring now to FIGURES 3, 4, and 7, inner flow plate 66 is also of frustoconical configuration and is formed of nine conical segments 74 typically fabricated from sixteen gauge (0.0625") 304 or 316 stainless steel. At predetermined intervals, upwardly opening, generally semiconical louvers 75 with closed lower ends 76 are punched or otherwise formed in flow plate 66, providing flow apertures 77 through the plate. As best shown in FIGURE 7, louvers 75 direct the treating fluid flowing upwardly in the lower part of the reaction vessel through nozzle plate apertures 77 into a downwardly and outwardly inclined path. In the range of approximately 30-40% of the treating fluid is discharged into the bed of solids being treated through inner flow plate 66. To insure proper rotation of bed 48, louvers 75 are formed so that they will direct the fluid flowing through apertures 77 at an angle of 30° or less to the upper surface 78a of inner nozzle plate 66.

In the embodiment of this invention mentioned previously, the assembled inner flow plate 66 has an outer diameter of 48 inches and an inner opening which is 24 inches in diameter. The radial distance between adjacent rows of louvers 75 is 1¾ inches and there are 76 apertures in each of the nine segments 74, the number of apertures varying from six in the innermost row to ten in the outermost row (the louvers are approximately 1⅜ inches on centers in all rows) to provide generally uniform distribution of the heated fluid flowing through the inner nozzle plate. The openings between the lower surface 78b of the flow plate and louvers 75 have a maximum width of ⅝ inches and a maximum depth of 0.10 inch.

Like outer plate 65, inner flow plate 66 is oriented with its upper surface 78a at an angle of approximately 45° to the horizontal when installed in reaction vessel 32. The angle the nozzle plates make with the horizontal may be increased but should not be decreased substantially below 30° to insure that the angle their upper surfaces make to the horizontal exceeds the angle of repose of the beans or other product being treated. If it does not, the product will not slide off the nozzle plates when dump mechanism 60 is operated to discharge the treated product from the reaction vessel.

From the foregoing it will be apparent that both the flow through apertures 70 in outer flow plate 65 and the flow through apertures 77 in inner plate 66 have large velocity components tangential to the fluidized rotating bed. This provides rapid and complete circulation of the solids in the rotating bed through paths of the configuration described above.

Referring now to FIGURE 2, inner nozzle plate 66 is fixed, as by welding, to a vertically extending sleeve 79 of dump mechanism 60. The upper end of sleeve 79 is fixed, as by welding, to the lower end of the piston rod 80 of a hydraulic motor 82 with the piston extending through a sealed aperture 84 in the top of reaction vessel shell 44 to the exterior of the reaction vessel. At its upper end piston rod 80 is fixed to a piston (not shown) in the hydraulic motor's cylinder 86, which is supported from the top of reaction vessel shell 44 in a framework identified by reference character 88.

The function and operation of the novel reaction vessel 32 just described will become clear shortly from a description of the operation of a typical application of the reaction vessel; viz., the plant 30 of FIGURE 1. As will become apparent hereinafter, however, this is by no means the only application of reaction vessel 32. The ensuing description of this exemplary application is therefore intended to be descriptive and not limiting.

Referring again to FIGURE 1, the system 36 included in coffee roasting installation 30 for providing the inert roasting gas for reaction vessel 32 includes an inert gas generator 89 for generating the inert gas, a compressor 90 for raising the pressure of the inert gas to a pressure at least equal to that which it is desired to maintain in reaction vessel 32, and an accumulator 92. The latter component is employed to insure that the supply of inert gas is adequate to rapidly pressurize gas circulation system 40 when plant 30 is started up and to rapidly replace gas vented from the reaction vessel during the roasting cycle. All of the foregoing components of the roasting gas generating system are conventional, commercially available items; and any type of equipment desired may be employed.

As shown in FIGURE 1, the roasting gas flows from the gas generating and accumulating system 36 into the heating system 38 provided for the roasting gas. The gas heating system is preferably of the closed, circulating liquid type and includes a chaff separator 93, a heater 94 for the circulating liquid heat exchange medium, a heat exchanger 96, in which the circulating medium gives up its heat to the roasting gas, and a bypass 98 for diverting the roasting gas around heat exchanger 96 to maintain its temperature constant. A suitable heating system of this type is disclosed in my Patent No. 3,236,292, issued Feb. 22, 1966, for High Temperature Heating Apparatus. Inasmuch as the details of the heating system are not critical to the practice of the present invention and as a suitable system is described in detail in the copending application, it is not believed necessary to describe it further herein.

The heated roasting gas is delivered from heat exchanger 96 to roasting or reaction vessel 32 by the fluid circulating system 40, the major component of which is a booster or blower 100. Like the components of installation 30 described previously, blower 100 may be of any desired commercially available construction.

As shown in FIGURE 1, reaction vessel 32 is also connected to chaff separator 93 in the roasting gas circulation system 40; the gas outlet of chaff separator 93 is in turn connected to heat exchanger 96. Thus, circulation system 40 is a closed loop for the roasting gas, permitting the gas exhausted from roasting vessel 32 to be recirculated through the chaff separator and heat exchanger and blower 100. This minimizes the amount of roasting gas which must be supplied from the inert gas generator during the roasting cycle, thereby minimizing the expense of operating the roasting installation.

Significant parameters relating to reactor geometry, gas flow, and bean charge in the roasting portion of coffee roasting plant 30 just described will vary from installation to installation. Thus, while the following table gives values for these parameters which have been found to produce excellent results in one actual installation constructed in accord with the principles of the present invention, it is to be understood that these values are merely exemplary and not critical.

Geometry:
    Bed outside radius, in. _____ 35.25
    Bed inside radius, in. _____ 12.0
    Bed area at top surface, ft.$^2$ _____ 24.0
    Total perforation open area in nozzle plates, ft.$^2$ _____ .44

Roasting gas:
    Pressure, p.s.i.g. _____ 140
    Inlet temperature, °F. _____ 430
    Volume flow rate, c.f.m.[5] _____ 3820
    Superficial velocity, f.p.m. _____ 164
    Density, lb./ft.$^3$ _____ .47
    Weight flow rate, lb./min.[5] _____ 1800
    Jet velocity at performations in nozzle plates, f.p.s. _____ 207
    Total internal pressure drop through nozzle plate and bed of beans, p.s.i. _____ 2.5

Bean charge (heavy beans):
    Weight, lb. _____ 850
    Bulk density, lb./ft.$^3$ _____ 43.5
    Volume, ft.$^3$ _____ 19.5
    Mean bed depth, ft. _____ .80
    Gas wt. flow/lb. charge, lb./min./lb.[5] _____ 2.12

Bean charge (light beans):
    Weight, lb. _____ 850
    Bulk density, lb./ft.$^3$ _____ 24.00
    Volume, ft.$^3$ _____ 35.44
    Mean bed depth, ft. _____ 1.48
    Gas wt. flow/lb. charge, lb./min./lb.[5] _____ 2.12

[5] Design flow rate. The rate of flow may be varied both above and below the design flow rate without adversely effecting the circulation of the beans in the reaction vessel, an important factor in the versatility of the present invention.

As shown by the values for mean bed depth under the headings for heavy and light beans, the mean bed depth in reactor 32 can be varied without upsetting the bean circulation pattern. The depth of the bed is not without importance, however. If the bed of solids is too deep, there will be slugging and erratic spouting and a high superficial velocity of the roasting gas, which will cause the bed to become too violent. On the other hand, if the bed is too shallow, the rotational circulation of the beans is suppressed. The bed depths at which these undesirable results occur vary from installation to installation and as the operating conditions of a particular installation are changed.

The remaining major component of coffee roasting installation 30 is the cooler 42 mentioned above. For the most part, the details of the cooler are not critical to the practice of the present invention; and, moreover, coolers of the type illustrated in FIGURES 9A and 9B are commercially available. Therefore, it is not believed necessary to describe the details of cooler 42 herein.

Briefly, however, this apparatus includes an elongated, cylindrical, cooling vessel or reel 102 rotatably supported from a frame 104 by car wheels or rollers 105 at the ends and the center of the cooler. The illustrated cooler 42 has a reel formed of 11 gauge, perforated, galvanized iron and is 16 feet long with an internal diameter of 60 inches. Cast iron rings 106, assembled on reel 102, engage car wheels 105 and prevent reel 102 from moving longitudinally relative to cooler frame 104. Reel 102 is surrounded by a housing of sheet metal construction identified generally by reference character 107. The details of housing 107 are not critical in the practice of the present invention and may be varied as desired.

Reel 102 is rotated at a speed or approximately 17 revolutions per minute by an electric motor 108 mounted on frame 104 and connected through a belt drive 109 to a shaft 110 rotatably supported from the framework 104 of the cooler. Bevel pinions 112, fixed to shaft 110, mesh with and rotate bevel gears 114 which, as shown in FIGURE 9B, drive the shaft 115 on which car wheels 105 are mounted. The car wheels engage the cast iron rings 106 at the ends and center of the reel and rotate it by friction.

As shown in FIGURES 9A and 9B, the beans to be cooled are dumped into reel 102 through a galvanized inlet chute 116. A helical guide (not shown), extending from one end of the reel to the other and fastened to the inside of the reel, distributes the beans from the inlet end 118 of cooler 42 to discharge end 120 as reel 102 rotates. At the discharge end of the cooler, the beans are discharged from reel 102 through a discharge chute 122 by a bucket type unloader (not shown).

After the roasted beans are dumped into cooler 42, they are sprayed with a fine mist of water[6] to quench the roast and to control the moisture content of the beans. For this purpose, cooler 42 is provided with a spray system including an elongated pipe or header 124 extending longitudinally through reel 102. Located at intervals of typical 21½ inches along header 124 are spray nozzles 126. Header 124 may be connected to any convenient source of water, the water flowing through header 124 and out nozzles 126 onto the beans in the form of a fine mist. As the bed of beans in reel 102 is continuously agitated as it is being sprayed, the foregoing system provides a uniform application of water to the beans.

The beans in reel 102 are also cooled by blowing air through the perforated reel for approximately 3–5 minutes. For this purpose, cooler housing 107 is provided with an air inlet 128 and a similar air outlet (not shown) on the opposite side of the housing, cooling air flowing in inlet 128, through reel 102 and the charge of beans therein, and out the exhaust opening.

A fan 130 (see FIGURE 1) is provided to effect the flow of cooling air through the cooler. Fan 130 may be of any desired construction.

Figure 12B:
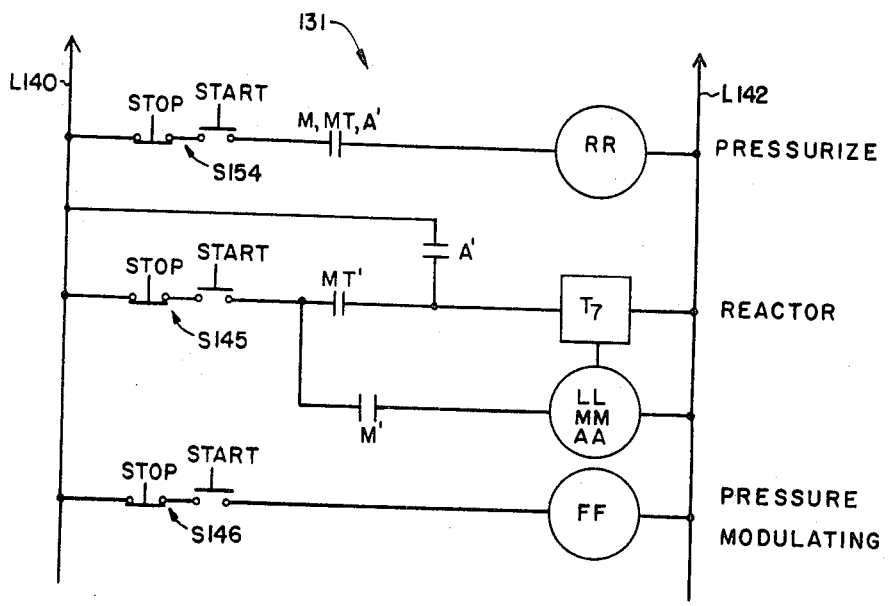
FIGURE 12 is a diagram illustrating the relationship of FIGURES 12A and 12B which, together, constitute a simplified electrical schematic of the control system employed in the installation of FIGURE 1.

The operation of the coffee roasting plant 30 just described is best understood by reference to FIGURES 10 and 12 which are, respectively, simplified schematics of plant 30 and of its control system 131 (see FIGURES 12A and 12B). Turning first to FIGURE 10, the plant is started up by putting the roasting gas generating and heating systems 36 and 38 into operation. As explained previously, the generator 89 produces inert gas (typically having a composition of approximately 88.5% nitrogen, 11% carbon dioxide, and 0.5% oxygen) which is compressed by compressor 90 and delivered to accumulator 92. From accumulator 92, the inert gas flows through conduit 132 into the gas circulating system 40 ahead of strainer 133 and then through the strainer. Strainer 133 prevents fine particles which remain in the recirculated roasting gas after it passes through chaff separator 93 from being recirculated to reaction vessel 32 and plugging the flow apertures in nozzle plates 65 and 66. From strainer 133, the inert gas flows into the heat exchanger 96 of gas heating system 38. Here, the inert gas is heated to a temperature typically on the order of 400–445° F. by a liquid heat transfer medium (such as Monsanto Chemical Company's Therminol FR-2) circulating through a closed path including heater 94, supply conduit 134, heat exchanger 96, and return conduit 136.

The roasting gas side of heat exchanger 96 is incorporated with reactor 32 in the closed gas circulating system 40. The heated inert gas is circulated through this system to purge it, stabilize its components at the temperature of the inert gas, and to increase the pressure in the system to the roasting pressure. The plant is then ready to process the first batch of beans.

Plant 30 is constructed so that the various steps in the process cycle may be controlled manually or automatically or by manual timed programming in which each step of the cycle is initiated manually but is thereafter automatically controlled. In the ensuing description of a coffee bean roasting cycle manual operation of the plant will be assumed for the sake of convenience.

Manual control is provided by closing a master switch S138 to complete the continuity in control circuit main leads L140 and L142 and moving a selector switch S144 (FIGURE 12A) to its Manual position, thereby energizing a relay M having normally open contacts M', all of which are closed by energization of the relay. Switch S145 (FIGURE 12B) is then moved to the "Start" position, completing a circuit between control circuit main leads L140 and L142 through the solenoids of normally open valves LL and MM. Energization of the foregoing solenoids closes valves LL and MM, isolating reactor 32 from the rest of the closed gas circulating system 40. This is an important feature of the present invention as it permits reactor 32 to be depressurized when it is loaded and unloaded without loss of pressure in the remainder of gas circulating system 40. Consequently, the vessel can be repressurized in minimum time and with a minimal power input after it is loaded; and, moreover, equilibrium conditions are maintained in the remainder of the circulation system.

At the same time or before switch S145 is closed to isolate the reactor vessel, a second switch S146 (see FIGURE 12B) is moved to "Start," completing a circuit between leads L140 and L142 through the solenoid of a normally closed valve FF. This opens valve FF and provides communication between a pressure modulating valve EE in the roasting gas conduit 132 between accumulator 92 and heat exchanger 96 and a pressurizing controller 148 arranged to sense the pressure in conduit 132. Controller 148 and valve EE regulate the flow of inert gas from accumulator 92 into conduit 132 while reactor 132 is isolated from the rest of the gas loop 40 to maintain the pressure on the booster side of the loop at a pressure preferably slightly above the selected roasting pressure.

After isolating valves LL and MM are closed, switch S150 is moved to the "Start" position, completing a circuit through the solenoid of a normally closed valve JJ between hopper 34 and reactor 32, opening valve JJ. This permits a charge of unroasted beans (850 pounds in the embodiment of the invention mentioned above) to flow from hopper 34 into reactor 32.

After reactor 32 is loaded, switch S150 is moved to the "Stop" position, deenergizing the solenoid of and closing valve JJ and thereby isolating reactor 32 from the surrounding atmosphere. Reactor 32 is then pressurized by closing switch S154 (see FIGURE 12B), which completes a circuit between leads L140 and L142 through the solenoid of normally closed pressurizing valve RR, opening the valve. This establishes communication between the booster and reactor vessel sides of isolating valves LL and MM, providing equalization of the pressure on the reactor and booster sides of the isolating valves in minimum time.

When the pressure in reactor 32 reaches on the order of 110 p.s.i.g., switch S145 is moved from the "Start" to the "Stop" position, deenergizing the solenoids of isolating valves LL and MM, thereby opening the valves and establishing communication between reactor 32 and the remainder of the gas circulating loop 40. This starts circulation of the roasting gas through reactor 32.

In a typical coffee roasting application of the present invention, the roasting of low grade, inexpensive African beans, the roasting pressure employed is preferably in the range of 130–150 p.s.i.g. and may advantageously be on the order of 140 p.s.i.g.[7] The reason for employing a pressure in this particular range is that, in roasting low grade African beans, which is the application for which pressures in the foregoing range are employed, if roasting pressures above 150 p.s.i.g. are employed, undesirable

---

[6] Sodium bicarbonate or other alkaline materials may be added to the water, if desired, to reduce the acidity of the roasted product although such treatment may normally not be required in roasting coffee in accord with the principles of the present invention.

[7] For milder coffees such as Guatemalan and Malacaton, best results qualitywise may be obtained at pressures on the order of 60–80 p.s.i.g. although the yield may be slightly lower. On the other hand, coffees have been successfully roasted at pressures as high as 300 p.s.i.g. by the techniques described herein. It will be apparent, therefore, that the processing pressure is not a fixed invariable parameter, but, for optimum results, must be altered for the particular product or type of product being treated and the nature of the treated product it is desired to obtain.

volatile constituents will be retained in the roasted beans; and coffee brewed from them will have a harsh metallic taste. On the other hand, if roasting pressures substantially below 130 p.s.i.g. are employed, losses in the roasting process will be unacceptably high.

For a roasting pressure of 140 p.s.i.g., reactor 32 is only pressurized to 125 p.s.i.g. at the beginning of the roast. This is because, as the heated roasting gas is initially circulated through the beans and their temperature increases, copious quantities of water vapor and other volatiles are given off by the beans. This rapidly raises the pressure in reactor 32 to the desired 140 p.s.i.g. roasting pressure. Consequently, by taking advantage of the presence of volatiles in the coffee beans, the amount of roasting gas required to pressurize reactor 32 can be substantially reduced.

The roasting gas is circulated from heat exchanger 96 by booster blower 100 through supply conduit 158 into reactor 32 through the inlet 50 in its lower end. As described previously, the heated roasting gas is directed into the bed of beans in the reactor by flow plates 65 and 66 in a manner which effects the novel circulation of the beans described previously and shown by arrows 64 in FIGURE 7. This provides a rapid turnover of the beans being roasted (the bed makes a complete revolution in about 1-2 seconds), providing a uniform and extremely rapid transfer of heat from the roasting gas to the beans.

From reactor 32, the roasting gas flows through return conduit 160 into chaff separator 93, which may be of the conventional centrifugal type, where the chaff picked up in reactor 32 is separated from the roasting gas. From the chaff separator, the cleaned roasting gas may flow through a further return conduit 164 and strainer 133 back into heat exchanger 96 or through bypass conduit 98 directly back into booster 100. Flow through bypass conduit 98 is controlled by a temperature responsive modulating valve V, which is regulated by a controller (not shown) responsive to the temperature of the roasting gas entering booster 100.

Since the liquid heat transfer medium circulating through heat exchanger 96 is maintained at a constant temperature, the heat exchanger cannot accommodate variations in the temperature and heat capacity of the roasting gas in return conduit 164. The bypass arrangement just described, however, varies the proportions of the roasting gas flowing through and around the heat exchanger to accommodate such variations and maintain the temperature of the roasting gas delivered to reaction vessel 32 by booster blower 100 constant.

To regulate the rate of flow of roasting gas through the reactor vessel, a bypass conduit 170 with a valve KKK is connected between the roasting gas supply and return conduits 158 and 160. By suitably positioning valves LL, MM, and KKK, the flow of roasting gas discharged from booster 100 may be proportioned between the reactor and bypass conduit. Conduit 170 and valve KKK are provided since different types of coffee beans are of different sizes and have different bulk densities and therefore require different rates of flow of the roasting gas through reactor 32 to produce the novel pattern of circulation shown in FIGURE 7.

In addition to providing a uniform roasting gas temperature, plant 30 is capable of maintaining a constant pressure in reaction vessel 32. To accomplish this, a modulating relief valve EEE is incorporated in a gas conduit 172 connected between vent conduit 174 (which leads to atmosphere) and a branch conduit 176 connected to the main gas return conduit 160. Valve EEE responds to the pressure in conduit 172, which is the same as the pressure in reactor 32; and vents reactor 32 through conduits 160, 176, 172, and 174 if the pressure in the reactor vessel rises above the desired roasting pressure.

A typical duration of the roasting period, depending upon the type of beans being roasted, is 4 minutes and 40 seconds to 7 minutes and 42 seconds [8] (this contrasts sharply with the conventional coffee roasting processes heretofore employed in which the roasting gas is heated to temperatures in the range of 600–700° F. and the beans are roasted for a period of 16–20 minutes. At the end of the roasting period, switch S145 (FIGURE 12B) is again moved to the "Start" position to energize the solenoids of and close valves LL and MM and thereby isolate reactor 32 from the rest of gas circulation loop 40. Switch S178 (FIGURE 12A), is then moved to the "Start" position, energizing the solenoids of normally closed slow vent valve DDD and normally closed equalizing valve GGG.

Opening of slow vent valve DD slowly vents reactor 32 through conduits 160, 176, and 174 and silencer 180 to atmosphere. The slow vent is provided to facilitate a controlled expansion and consequent reduction in bulk density of the roasted beans. Specifically, slow venting is required to prevent the excessive development of beans which would result if reaction vessel 32 were rapidly vented from a roasting pressure of 130–150 p.s.i.g., for example, to atmospheric pressure. The excessive development would be accompanied by an increase in weight loss and consequent reduction in yield. Typically reaction vessel 32 is vented from 130–150 p.s.i.g. to 20–50 p.s.i.g. in about 6 seconds in the slow vent; but the venting time and intermediate pressure may vary, depending upon the type of bean being roasted.

Movement of switch S178 to the "Start" position to open slow vent valve DDD also completes a circuit to the solenoid of a quick vent valve AAA as far as a pressure switch PS1, which is responsive to the pressure in main gas return conduit 160. When the pressure in conduit 160 and, therefore, in the reactor vessel drops to a pressure typically on the order of 50 p.s.i.g. (but which may be as low as 25 p.s.i.g.), pressure switch PS1 closes, completing the circuit to and energiizng the solenoid of quick vent valve AAA. This permits a quick venting (normally less or slightly more than one second) of the reactor vessel from the pressure at which switch PS1 is set to atmospheric pressure through conduits 160 and 182 and silencer 180. The quick vent from an intermediate pressure to atmospheric pressure has been found to be essential to proper development of the beans and consequent attainment of the desired bulk density of the roasted product.

Referring now to FIGURE 10, the equalizing valve GGG opened at the same time as slow vent valve DDD by movement of switch S178 to the "Start" position, is located in the branch gas return conduit 176 connected between gas supply conduit 158 and main gas return conduit 160. Opening of valve GGG permits venting of reactor 32 through both the supply conduit 158 and the return conduit 160. Therefore, reactor 32 is vented from both above and below the flow control assembly 62 in the reactor vessel since supply conduit 158 is connected to inlet 50 below the flow control structure and return conduit 160 to outlet 54 above assembly 62. This is an important feature of the present invention as venting from both sides of the flow control assembly prevents the imposition of harmful stresses on it.

After reactor 32 is vented, switch S178 is moved to the "Stop" position, closing the slow and quick vent valves DDD and AAA and pressure equalizing valve GGG. Switch S184 is then moved to the "Start" position, completing a circuit between control system leads L140 and L142 (see FIGURE 12A) through the solenoid of normally closed dump valve KK and a solenoid YYYY which

---

[8] Instead of roasting for a pre-established time, the roast may be continued until it reaches a predetermined temperature. Typically, this temperature may be on the order of 390–408° F. although it will depend upon the type of beans being roasted and the nature of the roast desired—e.g., the final bean temperature will be higher for a dark roast than a light roast. The roast may also be controlled by using a conventional color analyzer to stop the roast when the beans reach the desired color.

operates hydraulic motor 82. Upon energization of solenoid YYYY, hydraulic motor 82 moves dump sleeve 79 and the conical inner flow control plate 66 downwardly from the position shown in FIGURE 2 to the dump position shown in FIGURE 8. This allows the beans in reactor 32 to flow through the annular gap 185 between inner and outer flow plates 66 and 65 into the lower portion of reactor 32 and out dump opening 46 in the bottom of the reactor.

From discharge outlet 46, the roasted beans flow through a discharge conduit 186, in which the now open valve KK is located, into cooler 42. As soon as the roasted beans are in cooler 42, switch S188 is closed, completing a circuit through the solenoid of and opening normally closed valve OO. With valve OO open, a pump 189 of any desired construction circulates water from a tank 190 or other source through a line 192 into spray header 124 (see FIGURES 9A and 9B). This water is sprayed in the form of a fine mist from header 124 through spray nozzles 126 onto the beans as they are tumbled and agitated in rotating reel 102 as discussed previously.

The spray is preferably maintained for a period of 8–10 seconds and the flow through header 124 regulated so that at least 1.0 and preferably on the order of 1.1 gallons of water per 100 pounds of roasted beans or more is sprayed on them. The roasted beans are sprayed in the manner just described to quench the roast and stop it at a definite point and to control the moisture content of the roasted beans, as mentioned previously. Quenching of the roast is extremely important since it has been found that a variation of 5–10 seconds in a roast having a duraton of over six minutes will affect the characteristics of the roasted beans to such an extent that the difference in flavor will be readily detectable to the average coffee drinker.

In the conventional process water is dumped on the roasted beans as they lie in a quiescent mass in the bottom of the roasting vessel itself. A typical African bean roasted and quenched in this conventional manner has a yield loss of 15–16 percent. By roasting the same beans in the manner described above, but without a quenching spray, this loss is reduced to 11½–12 percent. By adding a spray of the type described above to add moisture to the roasted beans in a uniformly applied fine mist, the loss is further decreased to less than 10 percent, giving the process disclosed herein an important economic advantage over the conventional process.

There is another extremely important advantage to quenching the roasted coffee beans in the manner just described. In conventional processes, the shelf life of the roasted product is approximately inversely proportional to its moisture content. That is, as the moisture content is increased, the shelf life of the roasted product is correspondingly decreased. Unexpectedly, it has been found that coffees roasted in accord with the present invention, including the application of a spray in the manner just described, have a much longer shelf life than the same coffees roasted in the conventional manner, even though those roasted by the present process have a much higher moisture content.

As discussed above, one of the important features of the present invention is the step of slowly reducing the pressure on the beans at the end of the roasting cycle to provide an accurate controlled development of the beans. It has also unexpectedly been found that beneficial results can be provided by interrupting the roasting during the roasting cycle, similarly slowly reducing the pressure on the beans, and then repressurizing the reactor vessel and finishing the roast. Venting during the roast cycle is employed to reduce the pressure on undesirable volatiles and cause them to vaporize so that they can be vented from the reaction vessel. Consequently, venting during the roast may, particularly in the roasting of low grade coffees, be utilized to substantially upgrade the quality of the final product.

By controlling the temperature at which and the pressure to which the beans are vented in the interrupted roast, the nature of the roasted product produced from a given type of bean can be varied widely to suit the taste preferences of people in different areas and for other purposes. Particular bean temperatures and venting pressures vary widely depending upon the coffee being roasted and the nature of the roasted product desired. Generally speaking, however, lower grades will be vented less than more mild grades to retain desirable volatiles which are lost if the pressure on such beans is reduced too much. More mild coffees, on the other hand, are preferably vented to a greater extent because they will otherwise perhaps retain undesirable components which detract from their flavor and taste.

Typically, for low grade beans, reactor 32 may be vented from 140 p.s.i.g. to 100 p.s.i.g. for a period on the order of 6 seconds and then repressurized. However, as indicated above, depending upon the nature of the final product desired and the beans being roasted, both time and pressure parameters will vary widely. The following table shows how variations in these parameters affect the characteristics of the roasted product.

| Kind of Coffee | Venting Temp., °F.[1] | Vented to— (p.s.i.g.) | Remarks |
| --- | --- | --- | --- |
| Santos JAM-L11 | 300 | 60 | Good cup—best cup of 300° F. series. |
| Do | 300 | 80 | Slightly sharp. |
| Do | 300 | 100 | Good cup. |
| Do | 300 | 120 | Slightly sharp. |
| Do | 325 | 60 | Do. |
| Do | 325 | 80 | Very good cup. |
| Do | 325 | 100 | Slightly sharp. |
| Do | 325 | 120 | Do. |
| Do | 350 | 60 | Sharp. |
| Do | 350 | 80 | Good cup. |
| Do | 350 | 100 | Slightly sharp. |
| Do | 350 | 120 | Definitely sharp. |
| Do | 375 | 60 | Sharp. |
| Do | 375 | 80 | Slightly sharp. |
| Do | 375 | 120 | Good cup. |
| Rerun Of Best Samples From Above Gave Following Results | | | |
| Santos JAM-L11 | 300 | 60 | Very good cup. |
| Do | 325 | 80 | Do. |
| Do | 350 | 80 | Slight metallic or sharp flavor. |
| Do | 375 | 120 | Good cup. Not quite as high quality as the 300° F. and 325° F. samples. |

[1] Measured by a probe in the bed of beans 48.

Slow venting of reaction vessel 32 in the interrupted roast is accomplished in the same manner as described above in conjunction with the slow venting of reactor 32 at the end of the roast.

In addition to producing coffee to be ground for brewing, the apparatus of the present invention is also peculiarly adaptable to the roasting of coffee for the extraction process employed in the production of instant coffee. In roasting coffee beans for the production of instant coffee, the coffee is preferably roasted under pressure (with or without venting during the roast to remove undesirable volatiles) and then cooled under pressure without venting. The roasted beans are therefore undeveloped and have a high bulk density. However, this is immaterial in the production of instant coffee. The important advantage of both roasting and cooling under pressure is that the yields are even higher than when the beans are roasted and cooled in the manner just described.

In conjunction with venting during a roast to remove undesirable volatiles and venting during the cooling portion of the cycle to control development of the beans, it is to be understood that the exemplary venting pressures discussed above are not critical but may vary widely depending upon the product being roasted and the roasting conditions.

For example, as described previously, coffees may be roasted in accord with the principles of the present invention at pressures at least up to 300 p.s.i.g. In fact, for certain applications of the present invention, pressures on this order are preferred because losses in yield can be reduced to on the order of 2–3%. When roasting at pressures on this order, venting pressures substantially higher than those discussed above may be employed to remove undesired volatiles from the beans. For example, in roasting certain coffees, the undesired volatiles can be removed by venting the reaction vessel to a pressure typically on the order of 250 p.s.i.g.

In other words, the venting pressure is not a fixed constant, but must be varied from application-to-application. The important factors in conjunction with venting during the roast are: (1) that the pressure be selected to volatilize the undesirable constituents which it is desired to remove from the beans without volatilizing those which it is desired to retain; and (2) that the pressure be sufficiently high that losses in yield resulting from venting will not be unacceptably large.

Another important feature of the present invention is that it is not necessary to employ an inert roasting gas although such a gas is preferable for many applications of the present invention because it minimizes fire hazards which would be existent if air were employed as the roasting gas and also because, if air is employed as the roasting medium, the outside of certain types of coffee beans may be oxidized to a black color which is less preferable than a rich deep brown color.

However, it has been found that, by properly controlling the roasting parameters, the fire hazard can be minimized and unacceptable darkening of the beans can be prevented, even though an oxygen-containing gas is employed. And, unexpectedly, it has been found that the presence of at least some oxygen in the roasting gas is beneficial because the oxygen promotes certain of the flavor producing roasting reactions. The specific composition of the roasting gas, therefore, may and generally will vary considerably depending upon the particular type of beans to be roasted and the desired nature of the end product.

The composition of the roasting gas may be further controlled by treating the recirculated roasted gas before it is reheated in heat exchanger 96 to remove undesirable volatiles evolved from the roasting coffer which might otherwise be recirculated to and deposited on the beans in reactor 32 or enter into unwanted chemical reactions with them, thereby adversely affecting the roasted product.

This may be accomplished by cooling the recirculated roasting gas to condense the undesirable volatiles and thereby facilitate their removal from the roasting fluid. For the most part, the undesired volatile constituents apparently have boiling points well above the boiling point of water. Therefore, in cooling the recirculated roasting gas in accord with the principles of the present invention, the gas is preferably not cooled to a temperature below the boiling point of water. This is because the recirculated roasting gas contains a substantial portion of water vapor; and, if the water vapor is condensed, a large amount of sensible heat is removed from the recirculated gas and must be replaced in heat exchanger 96. However, by maintaining the temperature to which the recirculated gas is cooled above the boiling point of water, the undesirable high boiling point constituents can be removed from the treating fluid with only a minimal diminution of the sensible heat in the recirculated roasting fluid.

Although the recirculated gas is preferably not cooled below the boiling point of water for the limits discussed above, it is to be understood that this limit is not critical in the practice of the present invention. For example, in roasting certain types of coffees or other products, it may be necessary to cool the recirculated gas below the boiling point of water to insure the condensation of all undesired volatiles in the recirculated gas. In other applications, cooling to the boiling point of water may be too low as this may condense volatiles which it is desired to recirculate to the reaction vessel to, for example, promote beneficial reactions in the product being roasted. Therefore, the specific temperature to which the recirculated gas is cooled will necessarily vary with the nature of the installation and the type of produce being treated.

In addition, it may be neither desirable nor necessary to remove all of a particular constituent (or all of a number of constituents) from the recirculated gas. Consequently, the present invention contemplates removal of only a portion of the evolved volatiles present by removing such constituents from only a portion of the recirculated fluid.

Condensation of undesired constituents in the recirculated roasting fluid is readily and quickly accomplished by opening valve AA and closing valve BB (see FIGURE 10) to divert a part or all of the gas flowing through return conduit 164 through a condenser 193 connected in parallel with the return conduit. Valves AA and BB may be regulated manually or automatically; and their settings may be varied to alter the proportion of recirculated fluid flowing through the condenser. Consequently, by manipulating valves AA and BB, the composition of the roasting gas may be varied for a particular product or during the roast and compensations may be made for changes in the rate at which the undesirable volatiles are evolved during the roast.

In conjunction with the foregoing, it is not necessary that removal of volatile constituents from the recirculated roasting fluid be accomplished by the use of a condenser, as described above. For example, removal of volatile constituents may also be effected by passing the recirculated roasting fluid through a conventional scrubber such as shown at 193a in FIGURE 1. Referring now to the latter figure, valve CC may be partially or completely opened and valve DD closed to a corresponding extent to divert a part or all of the gas flowing through return conduit 164 through scrubber 193a. Valves CC and DD may be varied during the roast to alter the proportion of recirculated fluid flowing through the scrubber. Consequently, by manipulating valves CC and DD, the composition of the roasting gas may be varied for a particular product or during the roast to compensate for changes in the rate at which the volatiles to be removed are evolved during the roast.

It is not necessary that the roasting gas be maintained at a constant temperature throughout the roast. In fact, in order to develop desired characteristics in the roasted product, the roasting gas temperature may be varied during a part or all of the roast to promote and/or inhibit certain of the chemical reactions which take place in the beans as they are roasted. The temperature of the roasting gas may conveniently be altered during the roast by manually or automatically adjusting the roasting gas temperature responsive controller (not shown) which regulates modulating valve V. As explained above, valve V proportions the roasting gas flowing through return conduit 164 between heat exchanger 96 and bypass conduit 98 so that the gas delivered by booster 100 to reactor vessel 32 will be at the desired temperature. Alternatively, the variation in temperature may be accomplished by directing the roasting gas through a supplemental heat exchanger between heat exchanger 96 and reactor 32 or in any other manner desired.

As mentioned previously, the apparatus just described can be controlled by a manual timed mode of operation as well as manually. Referring again to FIGURES 12A and 12B, for manual timed operation selector switch S144 is moved to the "manual timed" position, deenergizing relay M to open contacts M' and energizing relay MT, closing contacts MT'. The closing of contacts MT' connects timers T1, T2, T4, T5, and T7 across control circuit leads L140 and L142 through switches S178, S188, S150, S154, and S145, respectively. The various timers are started by moving the associated switch to the "Start" position, completing a circuit through the timer motor. Thus, in this mode of operation, each of the process steps described above is initiated in the same manner as in manual operation; viz., by moving the involved switch to the "Start" position. For example, slow venting is accomplished in manual timed operation by moving switch S178 to the "Start" position as in manual operation.

Instead of energizing the solenoid of valve DDD to open this valve as in manual operation, however, movement of switch S178 to the "Start" position in manual timed operation energizes timer T1; and timer T1 controls the energization and deenergization of the valve operating solenoid. In other words, in manual timed operation, each step is initiated manually but is thereafter under the control of a timer. In the present invention, the timers are preferably of the automatically resetting type so that, after a timer controlled process step is completed, the timer will reset itself, readying the timer for the next process cycle.

For automatic operation of installation 30, selector switch S144 is moved to the "automatic" position and switch S194 to "Start," energizing relay A. This connects timers T1, T2, T4, T5, and T7 through contacts A′ directly across the energized control circuit leads L140 and L142. Thereafter the timers automatically control each of the process steps, as in manual timed operation; but, in addition, as each step is completed, a timer initiates the succeeding step. The details of the electrical components employed to provide manual timed and automatic operation are not part of the present invention and, therefore, will not be described herein.

Referring now to FIGURES 10 and 13, as mentioned above, a centrifugal separator 93 is employed to separate chaff from the roasting gas discharged from reactor vessel 32. Chaff separator 93 is connected by a conduit 195 to a chaff collector 196, which must be dumped periodically. Provision is made in installation 30 for accomplishing this manually and automatically.

Inasmuch as the dumping cycle normally does not coincide with the roasting cycle (generally the chaff collector need be dumped only once every three or four roasting cycles), the chaff collector control system operates on a cycle which is independent of that of the main control system. With specific reference now to FIGURE 13, for manual control over the chaff collector dumping cycle, selector switch S197 is moved to "manual," energizing relay M₁ to close contacts M₁′.

In manual operation of the chaff collector control system, the first step in dumping chaff collector 196 is to move switch S198 to the "Start" position, which energizes the solenoid of and closes normally an open transfer valve SSS in the conduit 195 between separator 93 and chaff collector 196. This isolates chaff collector 196 from the remainder of the closed roasting gas loop 40, preventing a decrease in pressure in the roasting loop when the chaff collector is dumped. Separator 93 will therefore continue to function in its normal manner; and dumping of the chaff collector consequently does not interrupt the operation of plant 30.

Vent switch S200 is then moved to the "Start" position, energizing the solenoid of and opening normally closed vent valve PPP, venting chaff collector 196 through conduit 202.

After the interior of chaff collector 196 reaches atmospheric pressure, dump switch S204 is moved to the "Start" position. This energizes the solenoid of and opens normally closed dump valve WWW, allowing the chaff in collector 196 to be discharged by gravity through dump conduit 206 into a receptacle or conveyor (not shown).

When the chaff collector is empty, dump switch S204 is moved to the "Stop" position, deenergizing the solenoid of and closing dump valve WWW. Purge switch S208 is then moved to the "Start" position, energizing the solenoid of and opening normally closed purge valve VVV to connect the interior of chaff collector 196 to roasting gas accumulator 92 through conduit 209. The inert roasting gas then flows from conduit 209 through chaff collector 196 and out vent conduit 202 through the still open vent valve PPP, purging air from the chaff collector.

This flow is continued until the chaff collector is purged of the air which enters the chaff collector with dump valve WWW open. After purging, switches S200 and S208 are moved to the "Stop" position, closing vent valve PPP, to isolate chaff collector 196 from the ambient atmosphere, and purge valve VVV, to terminate the purging flow of roasting gas through the collector.

Pressurizing switch S210 is then moved to the "Start" position, energizing the solenoid of and opening normally closed pressurizing valve RRRR; and transfer switch S198 is moved to the "Stop" position, deenergizing the solenoid of and opening transfer valve SSS to reestablish communication between chaff separator 93 and chaff collector 196 through conduit 195.

The sequence of steps just described may be carried out automatically by moving selector switch S197 to "Automatic." This energizes relay A, completing a circuit to time program controller 212 and completing circuits from the solenoids of valves SSS, PPP, WWW, VVV, and RRRR to cam switches S213a–e, respectively (the pairs of numerals 1, 1 through 5, 5 identify the cam switches connected to the various relay contacts A′). Cam switches S213a–e are incorporated in time program controller 212 and operated by timer cams (not shown) mounted on a motor-driven shaft in the conventional manner. Thus, as the cam shaft is rotated by the timer motor, timer switches S213a–e are opened and closed to operate the solenoids of the above-mentioned valves in the sequence described above in detailing the manual operation of the chaff collector controls.

Figure 11:
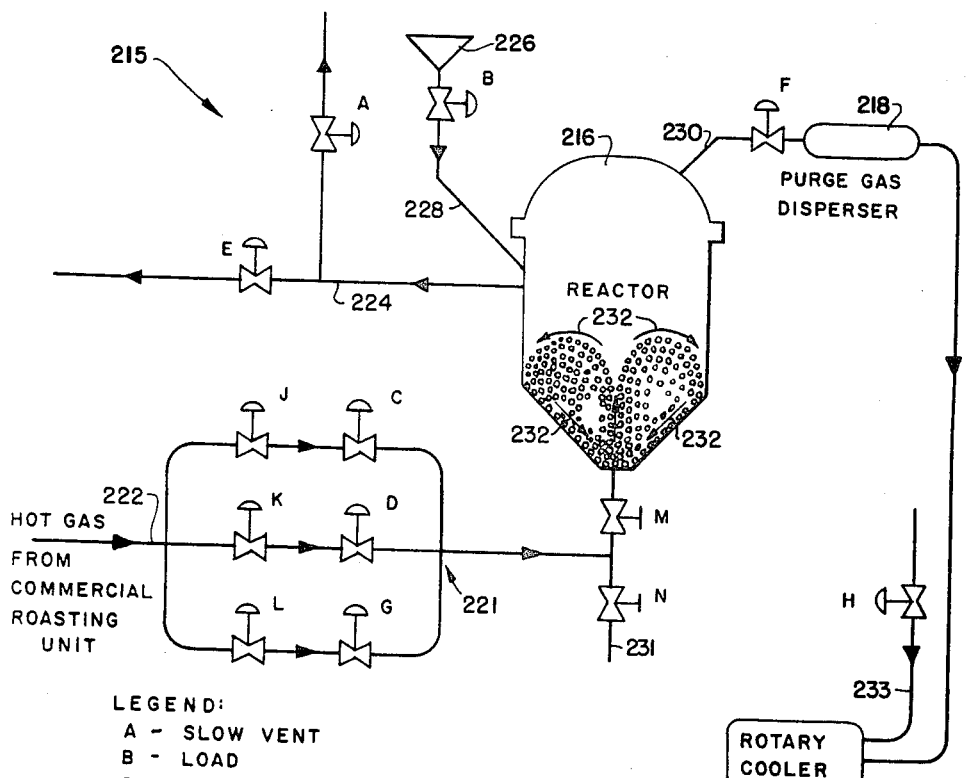
FIGURE 11 is a mechanical schematic of a supplemental roasting system incorporated in the installation of FIGURE 1 for treating samples of and thereby ascertaining the conditions required to roast a given product.

As discussed previously, parameters such as roasting temperatures, duration of roast, and the like must be varied for different types and blends of coffee to produce an end product having the desired characteristics. Inasmuch as reactor vessel 32 is intended to operate with a charge of 850 pounds of unroasted beans, it is economically impractical to employ reactor 32 to ascertain the roasting cycle parameters. Accordingly, a further novel feature of the present invention resides in the inclusion in plant 30 of an auxiliary laboratory sample coffee roasting system 215 (see FIGURE 11). The roasting parameters for reactor 32 can be ascertained by roasting small samples of a coffee or blend of coffees in this system.

Roasting system 215 includes a reactor 216 which, in one actual embodiment of the present invention, has a three pound capacity, a purge gas disperser 218, a rotary cooler 220, and a control system 221. Coffee roasting system 215 is connected into the main plant 30 by a roasting gas supply conduit 222 and a roasting gas return conduit 224. Supply conduit 222 is connected to main roasting gas supply conduit 158 adjacent the outlet of booster 100; and return conduit 224 is connected to main roasting gas return conduit 160 between reactor 32 and chaff separator 93. Consequently, any chaff picked up by the roasting gas flowing through reactor 216 will be removed in the chaff separator.

Reactor 216 is loaded from a hopper 226 connected to the reactor by a feed conduit 228 and is unloaded by blowing the beans from reactor 216 through conduit 230 into rotory cooler 220.

Reactor 216 is an elongated cylindrical shell and operates on the spouted bed principle described in detail in the Gishler patent identified above. As discussed previously, this mode of operation is not satisfactory for a commercial size roasting vessel because it is impossible, as a practical matter, to create a spout which is sufficiently large and stable to produce an adequate circulation of the beans or other product being roasted in a reactor of commercial size. However, adequate circulation can be obtained in a spouted bed in very small reactors such as is employed in auxiliary roasting system 215.

The control system 221 of coffee roasting system 215 includes valves A–N. Pressurize, roast, and purge valves J, K, and L are manual valves which are preset to control the rate of flow of the roasting gas to reactor 216 through valves C, D, and G, respectively. These valves are necessary and cannot be replaced by orifices since the flow rates for pressurizing, roasting, and purging vary with coffee beans of different initial bulk densities. Valves J, K, and L remain at one setting as long as any one particular kind of coffee is being run.

Valve M is a gate valve with the valve member drilled to simulate an orifice plate. Valve M permits the roasting gases to flow into reactor 216 through conduit 222; but prevents the beans from falling into reactor drain 231, which is provided for removal of condensate at initial start-up and for cleaning out reactor 216. A normally closed manual valve N in drain 231 isolates the reactor from the ambient atmosphere.

All other valves in the system are remotely controlled and, with the exception of isolating valves D and E, are closed during pre-roasting or "warm up."

At the start of the first run, valves D and E are closed to isolate reactor 216 from the main roasting gas circulation system 40; slow vent valve A is opened to vent the reactor; and, after reactor 216 reaches atmospheric pressure, valve B is opened to admit a charge of green beans to the reactor chamber.

Valves A and B are then closed, and valve C is opened to connect reactor 216 to roasting gas supply line 158 and pressurize the reactor. Valves D and E are opened when operating pressure is reached to start the flow of roasting gas from supply conduit 158 through conduit 222, reactor 216, and conduit 224 into main return conduit 160. Valve C is then closed. During the roasting cycle the beans are heated and continuously circulated in reactor 216 by the hot roasting gas as in main reactor 32 except that, in reactor 216, the roasting gas flowing up through the beans forms a spouted bed with the beans rising in the center of and migrating downward along the periphery of the reactor as shown by arrows 232 in FIGURE 11.

When the roast is completed, valves D and E are closed to stop the flow of roasting gas; valve A is opened to slowly vent reactor 216 to a predetermined intermediate pressure and, at this pressure, valve F is opened to quickly vent the reactor to atmospheric pressure. Slow venting of reactor 216 through valve A at the end of each roast is accomplished over a predetermined period of time (for instance 6 to 9 seconds). The rate of venting may be controlled by the size of vent conduit employed or by an orifice in the vent conduit either before or following valve A. The slow vent rate normally remains constant regardless of the type of bean being roasted.

The purpose of the quick venting, as discussed previously, is to physically develop the beans by rapidly expanding gases in the beans. As in the main reactor, the combination of slow and quick venting makes it possible to accurately control the development of the beans.

When reactor 216 reaches atmospheric pressure, load valve B is closed; and valve G is opened to admit a flow of gas into reactor 216 with sufficient velocity to lift the roasted beans upwardly through the reactor and carry them through valve F and purge gas disperser 218 into rotary cooler 220. The purge gas disperser is a screenlike cylinder which permits the major portion of the roasting gas to escape from conduit 230 with a resultant reduction in the velocity of the beans through the conduit. This prevents breakage and other damage to the beans during the rapid transfer from reactor 216 to cooler 220.

As soon as the beans are in rotary cooler 220, valve H, which is disposed in a conduit 233 connected between cooler 220 and a source of water (not shown), is opened to spray a predetermined amount of cooling water onto the beans in the cooler. The roasted beans remain in the rotary cooler when they are exposed to cooling gases for approximately three minutes, cooling them to approximately room temperature. They may then be removed from the cooler for grinding, etc. At the same time that valve H is opened to spray the roasted beans, purge valve G is closed; load valve B is opened; and the cycle described above is repeated. During the loading of the second batch of green beans and all subsequent batches, quick vent valve F rather than slow vent valve A is opened to insure proper venting of the reactor during loading and to prevent any air lock through valve B. Valve A is used during the initial run since it is undesirable to rapidly vent the reactor from normal operating pressure to atmospheric pressure through valve F.

Conditions which will produce a satisfactory roast in coffee roasting system 215 can be utilized to produce the same roast in main reactor 32. Therefore, when the taster has approved the coffee roasted in reactor 216, the roasting conditions can be established for the cycle of the main plant to produce an identical product in large volume.

It will be obvious to those skilled in the arts to which this invention pertains that many modifications may be made in the embodiment of the invention described above to optimize its performance for particular applications or for other reasons. One typical modification of the illustrated reactor 32, in accord with the foregoing, is the substitution of a nozzle plate 234 of the type shown fragmentarily in FIGURE 14 for the inner nozzle plate 66 shown in FIGURE 2. Nozzle plate 234 is of the same frustoconical configuration as nozzle plate 66, but is of substantially thicker material. Flow apertures 236 having a diameter of 0.136 inch are drilled through nozzle plate 234 at an angle of 30° in rows spaced apart a radial distance of 1.0 inches with the holes in each row evenly spaced approximately 1.0 inches apart. The entrance ends 238 of apertures 236 are countersunk to improve the flow of the heated roasting gas through the apertures; and the exit ends 240 are cut away at an angle of about 15° to prevent a build-up of bean residue in the apertures.

Like the nozzle plate 66 described previously, nozzle plate 234 is preferably made in sections and then welded or otherwise fastened together. The function of nozzle plate 234 is similar to that of nozzle plate 66; but the latter is preferred in most circumstances because it is less expensive to fabricate.

Another exemplary modification which may be made in the preferred embodiment of roasting vessel or reactor 32 is in the dump mechanism. One suitable alternate arrangement of this mechanism is shown in the reactor 242 illustrated in FIGURES 15 and 16. The same reference characters have been employed to identify like components of reactors 242 and 32.

Referring now to the foregoing figures, reactor 242 differs from reactor 32 primarily in the configuration of its frusto-conical outer and inner nozzle plates 244 and 246. Outer nozzle plate 244 extends downwardly to the bottom of the reactor where it is welded or otherwise fixed to the upper end of a bean discharge chute or conduit 247 extending through an aperture 248 in the bottom of the reactor. This change necessitates the employment of a shorter roasting gas inlet conduit 250 having an outlet 252 terminating below and adjacent outer nozzle plate 244.

Because of the foregoing change in the configuration of outer nozzle plate 244, inner nozzle plate 246 is constructed to rest on the inner or upper surface 254 of the outer nozzle plate when the dump mechanism is in the closed position shown in FIGURE 15 rather than engaging the lower peripheral edge of the outer nozzle plate as in the embodiment of FIGURE 2.

In this embodiment of the present invention, the beans slide down the upper surface 254 of the outer nozzle plate when the reactor is dumped rather than down the reactor shell as in the embodiment of FIGURE 2. Consequently, in the embodiment of the invention shown in FIGURES 15 and 16, it is not necessary to steeply incline the lower part of the reactor shell as in the embodiment of FIGURE 2.

Reactor 242 is dumped by energizing hydraulic motor 82 to lift sleeve 79 and inner nozzle plate 246 to the position shown in FIGURE 16. This provides an annular gap 256 between the nozzle plates through which the beans can flow into the lower part of the outer nozzle plate and out discharge chute 247.

Modifications may also be made in the manner in which the roasting fluid supplied to reactor 32 is heated. As discussed above, in the embodiment of the present invention illustrated diagrammatically in FIGURE 10, roasting gas heating system 38 is of the type in which a liquid heat transfer medium is circulated through a closed loop between a liquid heater and a heat exchanger. This type of system is preferred for many applications of the present invention because the large mass of circulating liquid has a "flywheel" effect and can consequently transfer large quantities of heat to the roasting fluid in a short period. This is highly important because, in the novel fluidized rotating bed of the present invention, heat transfer rates from the roasting fluid to the beans or other product being processed are extremely high. Therefore, the roasting fluid discharged from the reactor must be rapidly heated many degrees to bring it up to the roasting temperature before it is recirculated through the roasting vessel.

Figure 18:
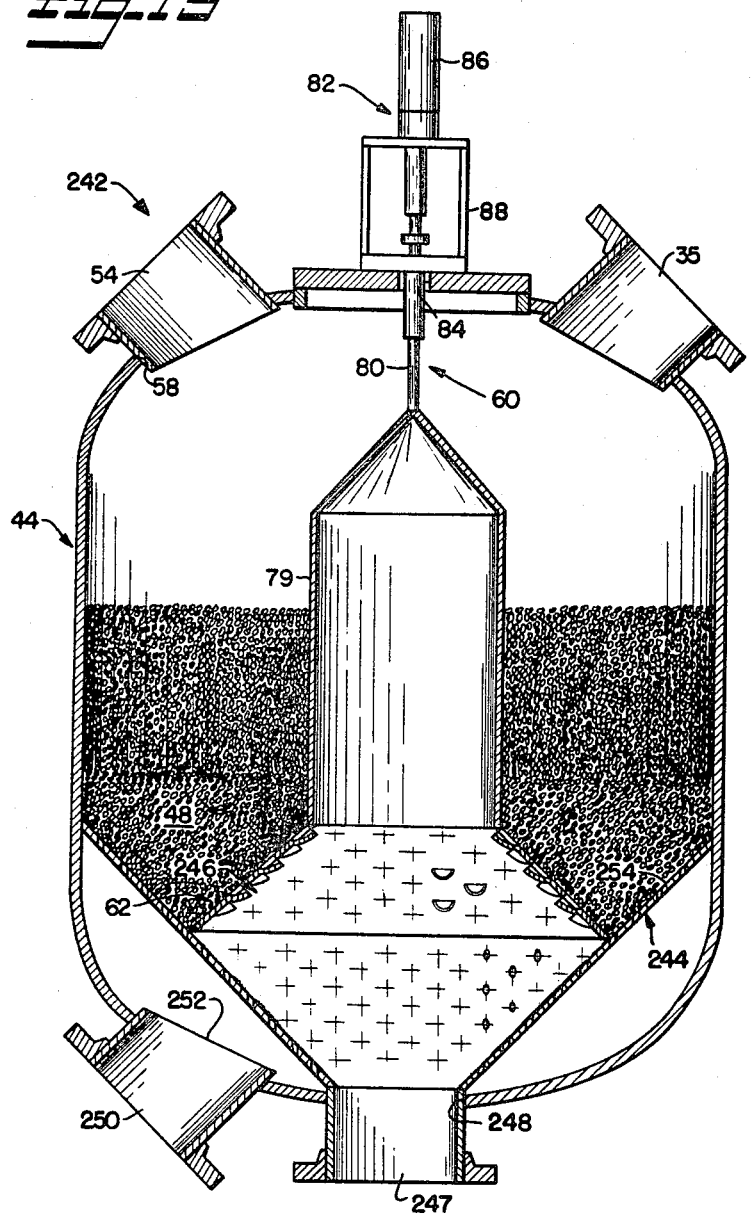
FIGURE 18 is a diagrammatic illustration of a second form of installation constructed in accord with the principles of the present invention.

However, for applications of the present invention where the flywheel effect is not so important, a more economically constructed heating unit 258 of the type shown in FIGURE 18, which is capable of both generating and heating the roasting gas, may be employed. Referring now to the just-mentioned figure, heating unit 258 includes a housing 260 surrounding a heating unit 262.

Heating unit 262 has a combustion chamber 264 of the jet tube type provided with a restricted outlet (not shown) from which the main tube 266 of a heat exchange unit 268 extends. At its outer end, main tube 266 is connected by U-shaped tubular members 270 to parallel return tubes 272 which communicate at their opposite ends with combustion chamber 264. Heat exchange unit 268 also includes a plurality of fins 274 fixed to main tube 266 and return tubes 272 in parallel, closely spaced relationship. Additional details of the above-described type of heating unit are disclosed in the United States Patent No. 2,823,659, issued Feb. 18, 1958, to John Fallon for Internally Fired Tubes for Heating Furnaces and Other Purposes, to which reference may be had, if desired.

In operation, a fuel-air mixture is fed to the heating unit's combustion chamber 264 and there burned. The combustion products circulate through the main supply and return tubes 266 and 272 of heat exchange unit 268, heating the latter. After circulating one or more times through the heat exchange unit, the combustion products are discharged through an outlet union 276. The exhaust gases or combustion products thus produced may advantageously be employed as a roasting fluid, particularly for applications where the presence of oxygen in the roasting fluid is undesirable, since they consist primarily of nitrogen, carbon dioxide and a small amount of water vapor.

From discharge union 276, the inert gas passes through a scrubber 278 of conventional construction and then, as in the embodiment of the present invention described previously, is compressed by compressor 280 and delivered to an accumulator 282. From accumulator 282, the roasting gases pass through a conduit 284 into the return conduit 286 connecting reactor 288 to heating unit 258. This gas, together with that discharged from reactor 288, passes through return conduit 286 into the housing 260 of heater 258, where it flows over emitting heat exchange unit 268 and is reheated to roasting temperature. The heated roasting gas is circulated by a boosted 290 back into roaster 288.

Heating units of the type illustrated in FIGURE 20 may be operated with the surface temperature of the tubes in heat exchange unit 268 as high as 1675° F. Inasmuch as the roasting gas is only heated to a temperature in the range of 400–440° F. the difference in temperature between the heat source and the exit temperature of the roasting gas from heating unit 258 may be well over 1200° F. Therefore, the arrangement illustrated in FIGURE 18 and just described is capable of transferring heat at a high rate to the roasting gas circulating through the heater.

Except for heating unit 258 and the addition of a scrubber 278, the plant illustrated in FIGURE 18 may be identical to that of FIGURE 10. Therefore, many details of the former have been eliminated from the illustration of FIGURE 18 for the sake of brevity. It is to be understood, however, that the system of FIGURE 18 can and preferably will be equipped with a control system of the type described previously and will preferably include part or all of the other novel features discussed above for greater flexibility and other operating advantages.

Figure 17:
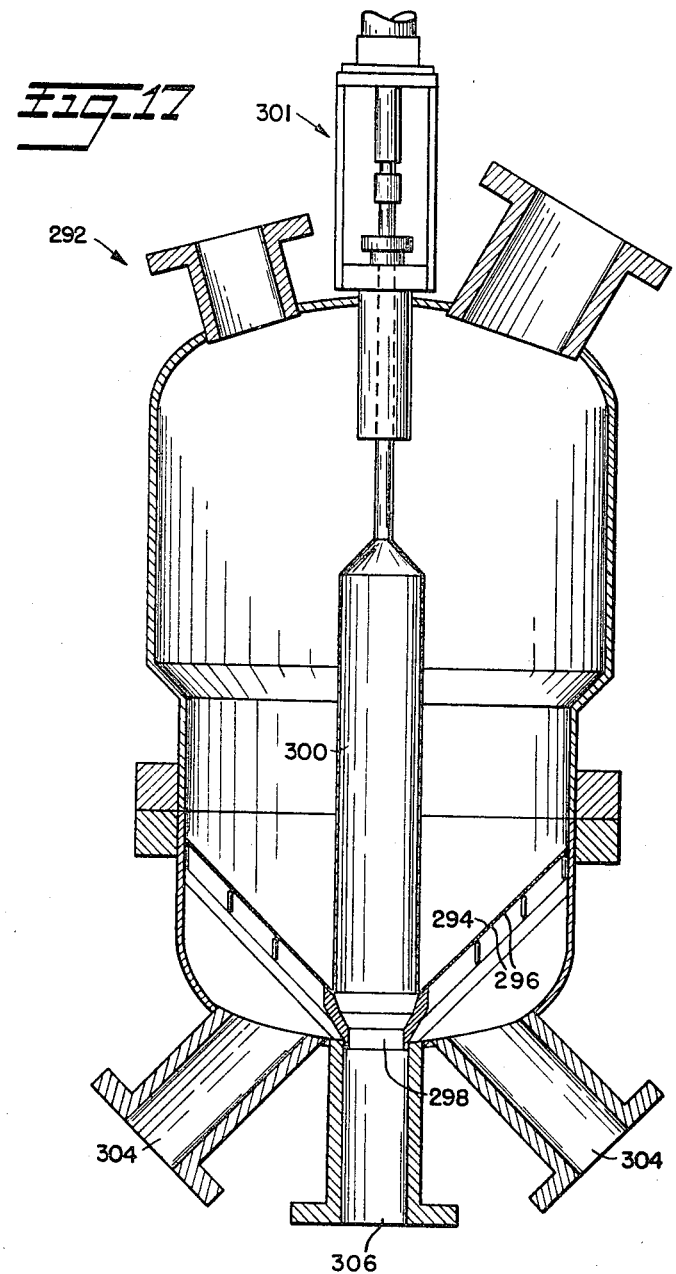
FIGURE 17 is a section through a modified form of reaction vessel constructed in accord with the principles of the present invention.

Another exemplary modification of the preferred embodiment of the present invention is shown in FIGURE 17, which illustrates a reactor vessel 292 similar to the reactor vessels 32 and 242 described previously, but equipped with only a single flow distributing and directing nozzle plate 294 rather than the combination of inner and outer plates of the earlier described embodiments. Nozzle plate 294 is of frustoconical configuration and is provided with evenly distributed flow apertures 296 similar to those in the outer nozzle plate 65 of FIGURES 5 and 6 drilled through the nozzle plate at an angle of 45° and a large central aperture 298 through which the coffee beans or other particulate solids being treated are discharged. In one actual reactor of the type shown in FIGURE 17, nozzle plate 294 is 23 inches in diameter; the flow apertures drilled through it have a diameter of 0.136 inch; and the central dump opening 298 has a diameter of five inches. The surfaces of the nozzle plate are inclined at an angle of 45° to the horizotnal.

Nozzle plate 294 is effective to fluidize and rotate the bed of solids being roasted in the same manner as the dual nozzle plates of the reactors described previously. The advantage of the arrangement of FIGURE 17 is that it is simpler and less expensive to fabricate. However, while the single nozzle plate 294 provides satisfactory circulation for smaller sized vessels (one actual reactor 292 of the type shown in FIGURE 17 has a 100 pound capacity), it is difficult to maintain a rapid circulation with a single nozzle plate in larger reactors such as the 850 pound capacity reactor illustrated in FIGURE 2. Therefore, for larger reactors the double plate flow control structure is preferred.

With the exception of the single nozzle plate, reactor 292 is substantially identical to reactors 32 and 242. The only other difference of any importance is that, in reactor 292, the lower end of dump sleeve 300 extends through and closes discharge opening 298 in contrast to the previously described embodiments in which the inner nozzle plate is employed for this purpose. Dump sleeve 300 is operated by a hydraulic motor 301 in the manner described previously in conjunction with the reactor illustrated in FIGURES 15 and 16.

Reactor 292 also has two inlets 304 for the hot roasting gas or other fluid symmetrically disposed about discharge conduit or channel 306, an arrangement which may be preferable for some applications of the present invention. This arrangement may also be employed in the reactors described previously; and, moreover, the number of air inlet conduits may be increased to more than two, if desired.

Typical geometry and operating parameters for a reactor of the type just described are tabulated below:

Geometry:
  Bed outside radius, in. _____ 11.5
  Bed inside radius, in. _____ 2.5
  Bed area at top surface, ft.$^2$ _____ 2.75
  Total perforation open area, ft.$^2$ _____ .049
Roasting gas:
  Pressure, p.s.i.g. _____ 140
  Inlet temperature, °F. _____ 430
  Superficial velocity, f.p.m. _____ 164
  Density, lb./ft. _____ .47
  Weight flow rate, lb./min. _____ 212
  Jet velocity at perforations, f.p.s. _____ 197
  Total pressure drop through nozzle plate and
    bed of beans, p.s.i. _____ 2.3
Bean charge (heavy beans):
  Weight, lb. _____ 100
  Bulk density, lb./ft.$^3$ _____ 43.5
  Volume, ft.$^3$ _____ 2.30
  Mean bed depth, ft. _____ .80
  Gas wt. flow/lb. charge, lb./min./lb. _____ 2.12
Bean charge (light beans):
  Weight, lb. _____ 100
  Bulk density, lb./ft.$^3$ _____ 24.0
  Volume, ft.$^3$ _____ 4.16
  Mean bed depth, ft. _____ 1.48
  Gas wt. flow/lb. charge, lb./min./lb. _____ 2.12

As discussed previously in conjunction with the operation of coffee roasting installation 30, beans roasted for the manufacture of instant coffee are preferably cooled under pressure because of the higher yield resulting from pressure cooling. The disadvantage in roasting conventional coffee in this manner is that there is no development of the beans; and the resulting product, therefore, has a high bulk density in comparison to the conventional product. Consequently, coffee cooled under pressure has a lower volume/weight ratio than that cooled at atmospheric pressure, which is disadvantageous in marketing the coffee.

It has now been found, however, that both the advantages of pressure cooling and development of the beans may be obtained by cooling the beans under pressure, slowly reducing the pressure in the cooling vessel to an intermediate pressure (as discussed previously, this pressure may typically be 25–50 p.s.i.g. or as high as 250 p.s.i.g., and then quickly venting the cooling vessel from the intermediate to atmospheric pressure. This process of cooling provides yields equivalent to those obtained by conventional pressure cooling and, in addition, provides the desired controlled development of the roasted beans discussed above in conjunction with the operation of coffee roasting installation 30.

Pressure cooling may be accomplished in a pressure type reaction vessel such as that shown in FIGURE 2, but is preferably carried out in a separate pressure vessel. Among the reasons for this are that cooling in the roasting vessel slows the process cycle; and, as discussed above, control of moisture content and longer shelf life can be obtained by spraying water on the roasted beans in a separate vessel in the form of a fine mist rather than dumping the added water on the beans in the roasting vessel as is conventionally done.

Pressure cooling in a separate vessel may be accomplished by substituting a pressurized cooler for the rotary cooler 42 of FIGURES 9A and 9B or by roasting and cooling the coffee in installations specifically designed for pressure cooling such as that shown diagrammatically and identified by reference character 308 in FIGURE 19. Referring now to the latter figure, coffee roasting installation 308 includes a charging hopper 310, a reactor 312, a cooler 314, and a discharge hopper 316 arranged one below the other. The beans to be roasted are fed from the source of supply (not shown) through a feed conduit 318 provided with a rotary valve 320 into charging hopper 310. Valve 320 is then rotated to the closed position to isolate the interior of the charging hopper from the ambient atmosphere; and hopper 310 is evacuated through vacuum line 322 to remove the air entering charging hopper 310 with the beans.[9] Valve 323 in line 322 is then closed to isolate charging hopper 310 from the ambient atmosphere.

Charging hopper 310 is then pressurized. In initial runs, this is accomplished by opening a valve 324 in a conduit 326 connecting charging hopper 310 to an accumulator 328 to which inert gas is delivered by a compressor 330 connected between the accumulator and an inert gas generator 331 in the same manner as in installation 30. In succeeding runs, however, the charging hopper is pressurized by opening a valve 332 in a conduit 334 connecting charging hopper 310 to discharge hopper 316 and energizing a transfer compressor 336 in conduit 334 to transfer inert gas from discharge hopper 316 to the charging hopper.[10]

After charging hopper 310 is pressurized with inert gas, valve 324 is closed. Reactor 312 is then pressurized by opening a valve 338 in a conduit 339 connecting the reactor to accumulator 328. After roasting pressure is reached, valve 338 is closed. Thereafter, the beans or other product to be roasted are transferred from charging hopper 310 to reactor 312 by opening a valve 340 in a transfer conduit 341 connecting the charging hopper and reactor. Valves 343 and 344 in roasting gas supply and return conduits 345 and 346 are then opened to effect a circulation of the roasting fluid through the reactor.

Reactor 312 may be identical to the reactor 32 discussed above; and, in installation 308, the coffee beans are roasted in the same manner as in reactor 32, the roasting gas being circulated by a booster 347 from a heater 348, where the roasting gas is heated or reheated, through supply conduit 345 into the reactor. From reactor 312, the roasting gas is recirculated through return conduit 346 to the heater. Roasting installation 308 thus has a closed circulation system for the roasting gas similar to the closed loop 40 of plant 30. This loop is preferably provided with the same bypass, flow regulating, and other novel features of loop 40 for optimum performance of reactor 312 and is connected to accumulator 328 by conduit 349.

Like reactor 32, reactor 312 may be vented during the roast with the advantages described above. This is accomplished by closing the valves 343 and 344 in supply and return conduits 345 and 346 to stop the circulation of the roasting gas and opening a valve 350 in a vent conduit 352 to vent the reactor vessel. After venting, valve 350 is closed and valves 343 and 344 reopened to resume flow of the roasting gas through reactor 312.

After the beans have been roasted for the desired period or to the desired color or temperature, valves 343 and 344 are closed, stopping the circulation of the roasting gas; and the cooler is pressurized to the desired cooling pressure (which is preferably generally equal to the roasting pressure) by opening a valve 354 in a conduit 356 connecting cooler 314 to accumulator 328. Dump valve 358 is then opened, permitting the roasting beans to flow from reactor 312 to cooler 314 through transfer conduit 360. Valve 354 is then closed, which isolates reactor 312 from cooler 314.

---

[9] Alternatively, charging hopper 310 may be purged of air by circulating a suitable gas through it. Or, for applications where the presence of air is not undesirable or even beneficial, the purging step may be omitted.

[10] In this and the preferred embodiment of the present invention, the inert gas generator may be replaced with a gas turbine, if desired. The turbine may be employed to drive the compressors, pumps, and similar equipment and its exhaust may be employed, as the treating fluid and for cooling as it is almost exclusively an inert mixture of nitrogen, carbon dioxide, and water vapor. The heat in the exhaust gases can also be extracted and employed to heat the treating fluid if the exhaust gases from the turbine are not employed as the roasting fluid.

Referring now to FIGURE 19, the same inert gas employed to roast the beans may also be used to cool them by connecting accumulator 328 through a conduit 362 to a cooling system 364 which includes a booster or circulator 366, supply and return conduits 368 and 370 connected to cooler 314, and a heat exchanger 371.

Circulation of the cooling fluid is initiated by opening valves 372 and 374 in supply and return conduits 368 and 370, permitting booster 366 to circulate the inert gas from conduit 362 through supply conduit 368 into and upwardly through the beans in cooler 314. From cooler 314, the cooling gas flows through return conduit 370 into heat exchanger 371, where the heated cooling gas is cooled.[11]

As the same time that or after the flow of cooling gas through cooler 314 is initiated, slow vent valve 376 is opened to slowly vent cooler 314 through vent conduit 378 to an intermediate pressure, typically on the order of 25–50 p.s.i.g. When the intermediate pressure is reached, quick vent valve 380 is opened, rapidly venting cooler 314 from the intermediate to atmospheric pressure through vent conduit 382. The vent valves are closed when the pressure in cooler 314 reaches atmospheric to prevent air from entering the cooler.

Cooler 314 is preferably provided with a spray system (not shown) like that employed in rotary cooler 42. After the circulated gas has cooled the beans in cooler 314 to a sufficiently low temperature to prevent water from flashing, water may be sprayed on the beans in the form of a fine mist as described above to arrest the roast and quickly complete the cooling and to control the moisture content of the roasted beans.

After the beans have cooled, a valve 384 in a transfer conduit 386 between cooler 314 and discharge hopper 316 is opened, permitting the cooled beans to flow by gravity from cooler 314 into the discharge hopper, which, if desired, may be pressurized by opening a valve 388 in a conduit 390 connecting discharge hopper 316 to accumulator 328, or, preferably, by transferring the fluid from charging hopper 310 to it by transfer compressor 336.

Valve 384 is then closed, valve 332 opened, and transfer compressor 336 started to transfer the inert gas from the discharge hopper back to charging hopper 310 for the purposes explained above. Valve 332 is next closed and a valve 392 opened to permit the roasted and cooled beans to flow from discharge hopper 316 through conduit 394 onto a suitable conveyor (not shown).

It will be apparent from the foregoing and from FIGURE 19 that each of the four pressure vessels 310, 312, 314, and 316 can be isolated from each other and from the ambient atmosphere. This is an important feature of this embodiment of the present invention as it materially speeds the process cycle. For example, while charging hopper 310 is being loaded with a first batch of beans, a second batch can be roasted in reactor 312, a third batch cooled in cooler 314, and a fourth batch discharged from discharge hopper 316. Thus, the time lost in transferring a batch of beans from one vessel to another in roasting installation 308 is minimized with a consequent reduction in process cost.

In addition to the spray system mentioned previously, roasting installation 308 will also preferably be provided with part or all of the novel control and other features described above in conjunction with roasting system 30. The foregoing have been omitted from the illustration of system 308 in FIGURE 19 for the sake of clarity and to avoid unnecessary repetition.

Many modifications may be made in the illustrated embodiments of the present invention in addition to those discussed above. To the extent that such modifications are not expressly excluded from the appended claims, they are fully intended to be covered therein.

As discussed above and from the foregoing description of exemplary applications of the present invention, it will also be readily apparent to those skilled in the arts to which the present invention pertains that its principles and the illustrated plants and apparatus, particularly the reactors disclosed herein and the flow controlling structure which they employ to produce the novel fluidized rotating bed described above, can be used for applications other than those specifically mentioned. All such applications of the present invention are also intended to be covered by the appended claims unless expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a system for contacting solids with a compressible treating fluid to effect a change in the physical or chemical characteristics of the solids or both:
  (a) a reaction vessel;
  (b) means by which particulate solids can be introduced into said vessel to form a bed of said solids therein;
  (c) means independent of the means by which the particulate solids are introduced into the reaction vessel and including a closed circulation system comprising the reaction vessel for circulating the treating fluid through said vessel to treat said solids;
  (d) means for pressurizing said vessel including means for increasing the pressure of the compressible treating fluid; and
  (e) means for isolating said vessel from the remainder of the circulation system, whereby said reaction vessel may be depressurized for loading and unloading and the like without depressurizing the remainder of said system.

2. In a system for contacting solids with a treating fluid to effect a change in the physical or chemical characteristics of the solids or both:
  (a) a reaction vessel;
  (b) means including a closed circulation system comprising the reaction vessel and a fluid circulator and supply and return conduit means connected to said vessel and to the discharge and inlet sides of said circulator for pressurizing and circulating the treating fluid through said vessel;
  (c) means for pressurizing said vessel including valves in said supply and return conduits for isolating said vessel from the remainder of the circulation system, whereby said reaction vessel may be depressurized without depressurizing the rest of said circulation system; and
  (d) modulating valve means on the discharge side of said circulator in said supply conduit means for maintaining a substantially constant pressure in said circulation system when said reaction vessel is isolated therefrom.

3. In a system for contacting solids with a treating fluid to effect a change in the physical or chemical characteristics of the solids or both:
  (a) a reaction vessel;
  (b) means including a closed circulation system comprising the reaction vessel and supply and return conduit means connected to said vessel and to the discharge and inlet sides of said circulator for pres-

---

[11] If desired, cooler 314 may be identical to reactor 312; and the cooling fluid may be circulated therethrough in the manner described previously to produce a fluidized rotating bed. This mode of cooling will uniformly and rapidly cool the hot treated solids discharged into the cooler from reactor 312.

surizing and circulating the treating fluid through said vessel;

(c) a chaff separator in said return line;

(d) a chaff collector;

(e) conduit means providing communication between the interior of said separator and the interior of said chaff collector;

(f) means for pressurizing said reaction vessel, said chaff separator, and said chaff collector;

(g) valve means in the conduit between the chaff separator and chaff collector for isolating the latter from said chaff separator whereby said collector can be isolated from said chaff separator and dumped without depressurizing the remainder of said system; and (h) means including valves in said supply and return conduits for isolating said vessel from the remainder of the circulation system, whereby said reaction vessel may be depressurized without depressurizing the rest of said circulation system.

4. In a system for contacting solids with a treating fluid to effect a change in the physical or chemical characteristics of the solids or both:

(a) a reaction vessel;

(b) means including a closed circulation system comprising the reaction vessel and a fluid circulator and supply and return conduit means connected to said vessel and to the discharge and inlet sides of said circulator for pressurizing and circulating the treating fluid through said vessel;

(c) means for pressurizing said vessel including valves in said supply and return conduits for isolating said vessel from the remainder of the circulation system, whereby said reaction vessel may be depressurized for loading and unloading and the like without depressurizing the rest of said circulation system;

(d) modulating valve means on the discharge side of said circulator in said supply conduit means for maintaining a substantially constant pressure in said circulation system when said reaction vessel is isolated therefrom; and (e) means including a second reaction vessel having a capacity which is a small fraction of that of the first reaction vessel connected between the supply and return lines for ascertaining before the first vessel is charged the operating parameters required to effect the desired treatment of said solids.

5. In a system for contacting solids with a treating fluid to effect a change in the physical or chemical characteristics of the solids or both:

(a) a reaction vessel;

(b) means including a closed circulation system comprising the reaction vessel and a fluid circulator and supply and return conduit means connected to said vessel and to the discharge and inlet sides of said circulator for circulating the treating fluid through said vessel; and (c) means including a second reaction vessel having a capacity which is a small fraction of that of the first reaction vessel connected between the supply and return lines for ascertaiinng before the first vessel is charged the operating parameters required to effect the desired treatment of said solids.

6. In a system for contacting solids with a treating fluid to effect a change in the chemical or physical characteristics of said solids or both:

(a) a reaction vessel;

(b) means for heating the treating fluid including a heat exchanger and supply and return conduits between said heat exchanger and said reaction vessel;

(c) means for circulating the treating fluid in a closed path including the reaction vessel, the fluid heating means, and a first bypass around said reaction vessel for varying the rate of flow through said vessel; and (d) means for varying the temperautre to which said fluid is heated during the treatment of said solids including a second bypass conduit connected around the heat exchanger between said supply and return lines and a thermostatically controlled flow controller including valve means in said second bypass conduit and responsive to the temperature of the fluid in said supply conduit for proportioning the flow of the treating fluid between said heat exchanger and said bypass conduit to maintain the temperature of the fluid in the supply conduit at the desired level.

7. In a system for contacting solids with a treating fluid to effect a change in the physical or chemical characteristics of the solids or both:

(a) a reaction vessel having means therein for controlling the flow of the treating fluid through the vessel;

(b) means for ciculating the treating fluid through said vessel including supply and return conduits on opposite sides of the flow control means;

(c) means for pressurizing and venting said vessel through one of said conduits;

(d) an equalizing conduit connected between the supply and return conduits; and (e) a valve in said equalizing conduit adapted to be opened when said vessel is vented to equalize the pressure on both sides of and thereby prevent the imposition of stress on said flow controlling means.

8. In a system for contacting solids with a treating fluid to effect a change in the physical or chemical characteristics of the solids, or both:

(a) a reaction vessel;

(b) means including a closed reaction system comprising the reaction vessel and supply and return conduits connected to said vessel for circulating the treating fluid through said vessel;

(c) valves in said supply and return conduits for isolating said vessel from the remainder of the fluid circulation system;

(d) an equalizing conduit connected across said isloating valves between the supply and return conduits; and (e) valve means in said equalizing conduit adapted to be opened to rapidly equalize the pressure on the opposite sides of said isolating valves when said isolating valves are opened with said vessel at atmospheric pressure and the remainder of the circulation system pressurized.

9. In a system for contacting solids with a treating fluid to effect a change in the physical or chemical characteristics of said solids or both:

(a) a reaction vessel;

(b) means for circuating the treating fluid through the reaction vessel including supply and return conduits communicating with the interior of the vessel;

(c) means for pressurizing said vessel;

(d) means for venting said vessel including first and second vent conduits communicating with said supply and return conduits, respectively, and valves in said vent conduits; and (e) means for opening one of said valves to vent the reaction vessel through the associated one of said vent conduits and thereby reduce the pressure in the reaction vessel; and (f) means responsive to a reduced pressure in the reaction vessel for thereafter opening the other of said valves and venting the reaction vessel through the other of said conduits associated therewith.

10. In a system for contacting solids with a treating fluid to effect a change in the chemical or physical characteristics of said solids or both:

(a) a reaction vessel;

(b) means for heating the treating fliud;

(c) means for circulating the treating fluid in a closed path including the reaction vessel and the fluid treating means including conduit means for conducting said fluid from said reaction vessel to the fluid heating means; and (d) means for cooling the fluid leaving the reaction vessel to thereby condense and facilitate the removal from said fluid of at least a part of the volatiles evolved from said solids and carried from the reaction vessel by said fluid, comprising a condenser, supply and return conduits connecting said condenser to said conduit means, said selectively adjustable valve means in said supply and return conduits for controlling the flow of said fluid through said condenser to thereby regulate the extent to which said fluid is cooled and the volatiles condensed therefrom.

11. In a system for contacting solids with a treating fluid to effect a change in the chemical or physical characteristics of said solids or both:
 (a) a reaction vessel;
 (b) means for heating the treating fluid;
 (c) means for circulating the treating fluid in a closed path including the reaction vessel and the fluid heating means including conduit means for conducting said fluid from the reaction vessel to the fluid heating means; and
 (d) means for removing from the fluid leaving the reaction vessel at least a part of the volatiles evolved from said solids and carried from the reaction vessel by said fluid, comprising a scrubber, supply and return conduits connecting said scrubber to said fluid conduit means, and selectively adjustable valve means in said supply and return conduits for controlling the flow of said fluid through said scrubber to thereby regulate the extent to which said volatiles are removed from the treating fluid.

12. In a system for contacting solids with a treating fluid to effect a change in the chemical or physical characteristics of said solids or both:
 (a) a reaction vessel;
 (b) a heating unit including:
  (1) a housing and a combustion type heater in said housing comprising a combustion chamber and a heat exchanger having means through which combustion products generated in said combustion chamber are adapted to be circulated to thereby heat said exchanger.
  (2) flow conduit means connecting the interiors of said heater and said housing; and
  (3) means for circulating combustion products from said heater through said conduit means into said housing and over said heat exchanger to thereby heat said combustion products;
 (c) a closed circulation system including said reaction vessel and said fluid heating means; and
 (d) means for circulating said treating fluid through said closed circulation system.

13. In a system for contacting solids with a treating fluid to effect a change in the physical or chemical characteristics of said solids or both:
 (a) a series of pressure vessels including a charging hopper, a reactor, a cooler, and a discharge hopper;
 (b) means for transferring solids from each of said vessels to the next and for transferring solids to and from the charging and discharge hoppers, respectively;
 (c) independently operable means for isolating each of said vessels from the other vessels and from the ambient atmosphere;
 (d) means for circulating a treating fluid through said reactor; and
 (e) means for circulating a cooling fluid through said cooler.

14. The system of claim 13, together with:
 (a) vent conduit means connected to said reactor and said cooler; and
 (b) independently operable means in each of said vent conduit means for selectively venting said reactor and said cooler.

15. The system of claim 13, together with:
 (a) means for pressurizing said pressure vessels; and
 (b) means for transferring the pressurizing medium between said charging hopper and said discharge hopper.

16. The system of claim 13, together with means for removing air from the system through said charging hopper, whereby said solids may be treated in an environment of controlled composition.

17. The system of claim 13, wherein the means for circulating the treating fluid through the reactor includes means for so directing the fluid through the reactor that the fluid effects fluidization and rotation of the solids in the reactor and for circulating the treating fluid through said fluidized and rotating solids.

References Cited
UNITED STATES PATENTS

| | | | |
|---|---|---|---|
| 2,101,417 | 12/1937 | Waldvogel | 99—236 |
| 2,172,603 | 9/1939 | Adams et al. | 99—236 |
| 2,188,969 | 2/1940 | Waldvogel | 99—236 |
| 2,216,921 | 10/1940 | Marvel | 259—120 |
| 2,622,605 | 12/1952 | Brooks | 134—102 |
| 2,746,865 | 5/1956 | Seizer et al. | 99—68 |
| 2,859,116 | 11/1958 | Heimbs et al. | 99—68 |
| 3,120,439 | 2/1964 | Reale | 99—234 X |

ROBERT W. JENKINS, *Primary Examiner.*

UNITED STATES PATENT OFFICE
CERTIFICATE OF CORRECTION

Patent No. 3,395,634

August 6, 1968

Horace L. Smith, Jr.

It is certified that error appears in the above identified patent and that said Letters Patent are hereby corrected as shown below:

Column 14, line 37, "energiizng" should read -- energizing --. Column 18, line 10, "produce" should read -- product --. Column 21, line 48, after "pressure", first occurrence insert -- ; --. Column 25, line 48, after "psig" insert -- ) --. Column 29, line 61, "ascertaiinng" should read -- ascertaining --. Column 30, line 1, "temperautre" should read -- temperature --; line 18, "ciculating" should read -- circulating --; line 73, "fliud" should read -- fluid --. Column 31, line 45, after "said" insert -- heat --.

Signed and sealed this 10th day of February 1970.

(SEAL)
Attest:

Edward M. Fletcher, Jr.
Attesting Officer

WILLIAM E. SCHUYLER, JR.
Commissioner of Patents